(12) United States Patent
Ide et al.

(10) Patent No.: US 10,560,311 B2
(45) Date of Patent: Feb. 11, 2020

(54) MANAGEMENT APPARATUS, MANAGEMENT METHOD, AND RECORDING MEDIUM

(71) Applicant: HITACHI, LTD., Tokyo (JP)

(72) Inventors: Takaya Ide, Tokyo (JP); Hitoshi Yabusaki, Tokyo (JP); Junji Kinoshita, Tokyo (JP); Osamu Takada, Tokyo (JP)

(73) Assignee: HITACHI LTD., Tokyo (JP)

( * ) Notice: Subject to any disclaimer, the term of this patent is extended or adjusted under 35 U.S.C. 154(b) by 81 days.

(21) Appl. No.: 15/743,914

(22) PCT Filed: Oct. 14, 2015

(86) PCT No.: PCT/JP2015/079034
§ 371 (c)(1),
(2) Date: Jan. 11, 2018

(87) PCT Pub. No.: WO2017/064766
PCT Pub. Date: Apr. 20, 2017

(65) Prior Publication Data
US 2018/0212818 A1    Jul. 26, 2018

(51) Int. Cl.
*H04L 12/24* (2006.01)
*H04L 12/26* (2006.01)
(Continued)

(52) U.S. Cl.
CPC ...... *H04L 41/0654* (2013.01); *G06F 9/45558* (2013.01); *H04L 12/56* (2013.01);
(Continued)

(58) Field of Classification Search
None
See application file for complete search history.

(56) References Cited

U.S. PATENT DOCUMENTS 5,872,911 A * 2/1999 Berg ............... H04L 43/00
                                                      379/111
10,129,114 B1 * 11/2018 Kowalski .......... H04L 43/16
(Continued)

FOREIGN PATENT DOCUMENTS

| JP | 2010-135871 A | 6/2010 |
|----|---------------|--------|
| JP | 2011-188422 A | 9/2011 |
| JP | 2013-150134 A | 8/2013 |

OTHER PUBLICATIONS

International Search Report for WO 2017/064766 A1, dated Nov. 17, 2015.

*Primary Examiner* — Chirag G Shah
(74) *Attorney, Agent, or Firm* — Volpe and Koenig, P.C.

(57) ABSTRACT

A management apparatus executes: receiving from a given communication apparatus where a fault has occurred, fault information; selecting a given flow that passes through the given communication apparatus from among a group of flows on the basis of the identification information of the given communication apparatus included in the fault information; determining whether the communication pattern of the given flow is similar to the given time series data indicating the change over time of the traffic within a period from a set period prior to the fault occurrence date and time to the fault occurrence date and time for the given flow; calculating the certainty that the given flow has been transmitted on the fault occurrence date and time on the basis of a frequency of appearance of the traffic of the communication pattern determined to be similar; and outputting calculation results.

15 Claims, 21 Drawing Sheets

(51) Int. Cl.
*H04L 12/54* (2013.01)
*G06F 9/455* (2018.01)
(52) U.S. Cl.
CPC .......... *H04L 41/147* (2013.01); *H04L 43/026* (2013.01); *H04L 43/0823* (2013.01); *G06F 2009/45591* (2013.01); *G06F 2009/45595* (2013.01); *H04L 41/0631* (2013.01); *H04L 43/062* (2013.01)

(56) References Cited

U.S. PATENT DOCUMENTS

| | | | |
|---|---|---|---|
| 2009/0180393 A1 | 7/2009 | Nakamura | |
| 2011/0246647 A1* | 10/2011 | Marquezan | H04L 43/00 709/224 |
| 2013/0191829 A1 | 7/2013 | Shimokawa et al. | |
| 2014/0153396 A1* | 6/2014 | Gopalan | H04L 41/142 370/235 |
| 2016/0179598 A1* | 6/2016 | Lvin | G06F 11/079 714/48 |
| 2016/0277299 A1* | 9/2016 | Kadaba | H04L 12/56 |
| 2016/0328256 A1* | 11/2016 | Colla | G06F 9/45558 |

* cited by examiner

FLOW CHARACTERISTIC INFORMATION TABLE 800

| 801 | 802 | 803 | 804 | 805 | 806 | 807 | 808 | 809 | 810 |
|---|---|---|---|---|---|---|---|---|---|
| FLOW ID | DESTINATION MAC ADDRESS | SOURCE MAC ADDRESS | FRAME TYPE | DESTINATION IP ADDRESS | SOURCE IP ADDRESS | IP PROTOCOL | DESTINATION PORT NUMBER | SOURCE PORT NUMBER | VIRTUAL NW ID |
| Flow1 | aa:bb:cc:dd:ee:ff | ff:ee:dd:cc:bb:aa | IPv4 | 10.0.0.8 | 10.0.0.9 | TCP | 1434 | 36025 | 1000 |
| Flow2 | 11:22:33:44:55:66 | 77:88:99:aa:bb:cc | IPv4 | 10.0.0.20 | 10.0.0.1 | UDP | 53 | 23948 | 1001 |
| Flow3 | ff:ff:ff:ff:ff:ff: | 12:34:56:78:9a:bc | ARP | 10.0.0.8 | 10.0.0.5 | | - | | 1000 |

*FIG. 8*

TIME SERIES DATA TABLE 900

| FLOW ID | COMMUNICATION APPARATUS ID | CALCULATION TIME | ESTIMATED NUMBER OF PACKETS | ACQUISITION SOURCE DC ID |
|---|---|---|---|---|
| Flow1 | Sw1, Sw2 | 2015-06-10T10:00 | 4000 | - |
| Flow2 | Sw5, Sw8, Sw9 | 2015-06-10T10:00 | 1200 | - |
| Flow1 | Sw1, Sw2 | 2015-06-10T10:10 | 3500 | - |
| Flow2 | Sw5, Sw8, Sw9 | 2015-06-10T10:00 | 1400 | DC3 |

FIG. 9

COMMUNICATION PATTERN INFORMATION TABLE 213

| FLOW ID 1001 | COMMUNICATION PATH 1002 | PERIODICITY 1003 | PERIOD [S] 1004 | PATTERN ID 1005 | DATA INTERVAL 1006 |
|---|---|---|---|---|---|
| Flow1 | Sw1, Sw2 | PRESENT | 86400 | Pattern1 | 2015-06-10T00:00~2015-06-10T23:50, 2015-06-17T00:00~2015-06-17T23:50, .. |
|  |  |  |  | Pattern2 | 2015-06-11T00:00~2015-06-11T23:50, 2015-06-12T00:00~2015-06-12T23:50, .. |
| Flow2 | Sw5, Sw8, Sw9 | ABSENT | — | Pattern4 | 2015-06-10T00:00~2015-06-11T23:50, 2015-06-11T00:00~2015-06-12T23:50, .. |
| Flow4, Flow5 | Sw3, Sw4, Sw6, Sw7 | PRESENT | 3600 | Pattern3 | 2015-06-11T00:00~2015-06-11T05:50, 2015-06-12T06:00~2015-06-12T11:50, .. |

FIG. 10

| 1301 | 1302 | 1303 |
|---|---|---|
| DC ID | FAULT ESTIMATION SYSTEM IP ADDRESS | EXTERNAL IP ADDRESS |
| DC 2 | 192.168.0.20 | 10.1.2.3 |
| DC 3 | 192.168.0.30 | 10.4.5.6, 10.4.5.7 |

| 1401 | 1402 | 1403 |
|---|---|---|
| DC ID | FAULT OCCURRENCE TIME | FAULT RECOVERY TIME |
| DC 3 | 2015-06-10T08:30 | 2015-06-10T09:00 |
| DC 2 | 2015-06-15T16:00 | 2015-06-15T17:50 |

| 1501 | 1502 | 1503 |
|---|---|---|
| DC ID | STORED CUSTOMER ID | FLOW ID |
| DC 2 | Tenant A | Flow1 |
| | | Flow2 |
| | Tenant B | Flow4 |
| DC 3 | Tenant C | Flow9 |

MANAGEMENT APPARATUS, MANAGEMENT METHOD, AND RECORDING MEDIUM

BACKGROUND

The present invention relates to a management apparatus that manages a network that connects a group of computers, a management method, and a recording medium.

Use of data centers that provide cloud services has been developing in order for corporations and organizations to utilize computer resources and applications in an inexpensive and flexible manner. If a communication fault occurs in the data center, the manager of the data center needs to quickly respond to customers and applications that have been affected by the communication fault. Conventionally, customers that have possibly been affected by communication faults (hereinafter referred to as "potentially affected customers") are identified using static configuration information of the data center (connection and setting information for the server and communication apparatus, for example).

However, the information that can be gleaned from static configuration information is whether there is a possibility that communication of the customer passes through where the fault has occurred. It would therefore be unclear when a fault has occurred whether the customer was actually engaging in communication, and whether the customer was actually affected by the fault (such customers are referred to "affected customers") or not (such customers are referred to as "unaffected customers"). Thus, if there are many potentially affected customers when the fault has occurred, the manager of the data center would be unable to distinguish between affected customers and unaffected customers, and in some cases would respond to unaffected customers before affected customers.

Therefore, in order to distinguish affected and unaffected customers, it would be necessary to determine whether the customer was using the network where the fault has occurred when the fault has occurred on the basis of whether the customer was engaging in communication. JP 2011-188422 A and the specification of US 2009/0180393 A1 are disclosures of such a technique.

JP 2011-188422 A proposes a method in which session information is managed using a resource management apparatus, and when a fault occurs, the customer affected by the fault (corresponding to the above-mentioned affected customer) is identified by comparing the fault information (fault occurrence location, fault occurrence time, time of recovery from fault) with the session information. The session information disclosed in JP 2011-188422 A refers to information that is a combination of the start time and end time of communication and the service endpoints (source and destination IP (Internet Protocol) address).

The specification of US 2009/0180393 A1 proposes a packet sampling method by which the topology of a network is estimated on the basis of communication packets flowing in the network, and anomalies in quality in other networks and the affected range thereof can be determined using the topology information and packet sampling information.

However, even with the techniques of JP 2011-188422 A and the specification of US 2009/0180393 A1, it is not possible to quickly identify customers that have been affected by communication faults in the data center, that is, affected customers. For example, in JP 2011-188422 A, it is assumed that the resource management apparatus would use session information, but it is difficult for a data center used for cloud services to manage session information. Specifically, in order to know the start time and end time of communication in a session, it would be necessary to always gather and analyze all communications in the data center and to determine the start and end of each session. However, it is difficult to analyze in real time all communications in a data center where vast amounts of communication occur, and it would not be possible to quickly identify customers who were affected by the fault. Also, in the specification of US 2009/0180393 A1, only communications with a large traffic are sampled, and thus, it is not possible to ascertain the communication usage for users with small traffic.

SUMMARY

The present invention takes into consideration the above points, and an object thereof is to estimate quickly and with high accuracy the degree of certainty that a customer was affected by a fault.

An aspect of the invention disclosed in this application is a management apparatus connected to a network that connects a group of computers, comprising: a processor that executes a program; a storage device that stores the program; and an interface that connects to the network, wherein the storage device stores a communication pattern indicating periodic change over time in a traffic of a flow for a customer that is a series of data flowing between computers within the group of computers in the network, and identification information of a communication apparatus in the network through which the flow passes, and wherein the processor executes: a reception process that receives, from a given communication apparatus where a fault has occurred in the network, fault information that includes the identification information of the given communication apparatus and a fault occurrence date and time; a selection process of selecting a given flow that passes through the given communication apparatus from among a group of flows on the basis of the identification information of the given communication apparatus included in the fault information received during the reception process; a determination process of determining whether the communication pattern of the given flow is similar to the given time series data indicating the change over time of the traffic within a period from a set period prior to the fault occurrence date and time to the fault occurrence date and time for the given flow selected by the selection process; a calculation process that calculates the certainty that the given flow has been transmitted on the fault occurrence date and time on the basis of a frequency of appearance of the traffic of the communication pattern determined to be similar by the determination process; and an output process of outputting calculation results obtained by the calculation process.

According to a representative example of the present invention, the degree of certainty that a customer was affected by a fault can be estimated quickly and with high accuracy. Other objects, configurations, and effects than those described above are clarified by the following description of an embodiment.

BRIEF DESCRIPTION OF THE DRAWINGS

FIG. 8 is a descriptive view showing an example of the flow characteristic information table.

FIG. 9 is a descriptive view showing an example of the time series data table.

FIG. 10 is a descriptive view showing an example of the communication pattern information table.

FIG. 13 is a descriptive view showing an example of the external DC management information table.

FIG. 14 is a descriptive view showing an example of the external DC fault table.

FIG. 15 is a descriptive view showing an example of the external DC customer information table.

DETAILED DESCRIPTION OF THE EMBODIMENT

<Example of Customer Fault Effect Estimation>

Figure 1:
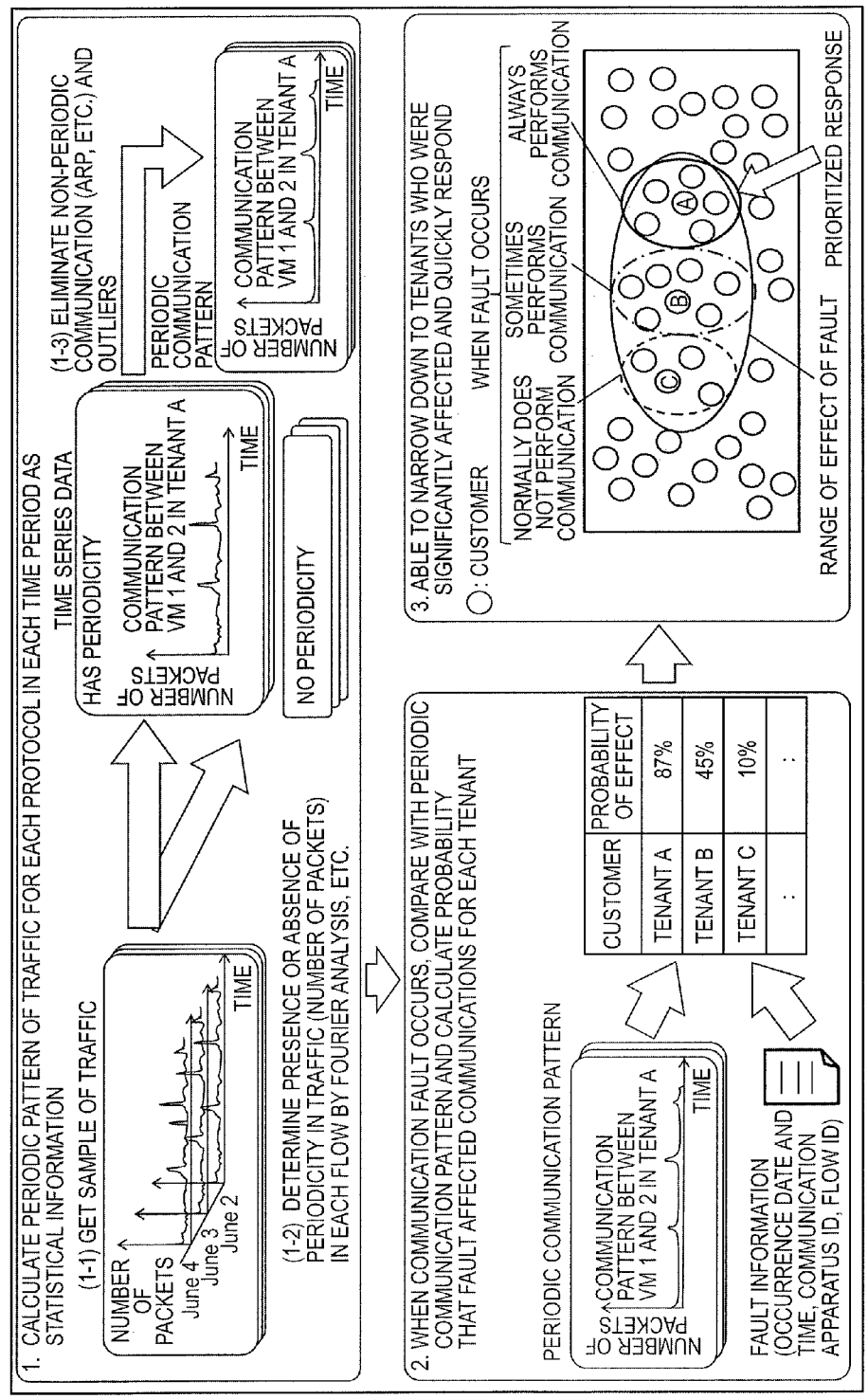
FIG. 1 is a descriptive view showing an example of customer fault effect estimation.

FIG. 1 is a descriptive view showing an example of customer fault effect estimation. Customer fault effect estimation is a process by which a management apparatus processes estimation of the effect of a fault on a customer through a communication apparatus such as a switch that relays communications within a network system.

1. The management apparatus calculates as statistical information periodic communication patterns for traffic for each protocol during each time period in a communication apparatus in a network system. Specifically, (1-1) the management apparatus samples packets relayed by the communication apparatus and measures the traffic (number of packets).

(1-2) The management apparatus determines the presence or absence of periodicity in communications by Fourier analysis. In the example of FIG. 1, the management apparatus determines that there is periodicity in communications between virtual machines VM1 and VM2 of a customer (tenant A).

(1-3) The management apparatus eliminates as outliers communications with no periodicity such as ARP (Address Resolution Protocol) packets, from the communication pattern detected in (1-2). The communication pattern of (1-3) is referred to as a periodic communication pattern. Thus, by sampling past traffic, the management apparatus can generate periodic communication patterns in advance prior to the occurrence of faults without always analyzing all communications within the network system and regardless of the traffic.

2. Next, the management apparatus compares fault information when a communication fault has occurred in the network system with the periodic communication pattern, and calculates the certainty that communications have been affected for each tenant. The fault information is information identifying a fault, and includes, for example, the time at which the fault occurred, and the ID of the communication apparatus where the fault has occurred. Also, if a fault has occurred in an inter-data center network in the network system, then the information additionally includes the ID of flows that have possibly been impacted by the fault. The effect certainty indicates how certain communications have been affected, and can be expressed as a probability, for example.

3. The manager can narrow down the customers who have been markedly affected and quickly handle the situation. Customers who have been markedly affected are customers for whom there is a high probability (70% or higher, for example), as calculated in 2 above, of being affected when a fault has occurred. Such customers are assumed to be those who always conduct communication. Also, customers with a low probability of being affected (0% to less than 30%, for example) are assumed to be those who do not typically perform communication. Additionally, customers with a probability of being affected of 30% to less than 70%, for example, are assumed to be those who occasionally perform communication.

In this manner, the management apparatus determines affected customers and unaffected customers in the range of effect by a fault when a fault has occurred, and thus, the manager can quickly narrow down affected customers for whom swift response is necessary, and can prioritize such customers.

<Network System Configuration Example>

Figure 2:
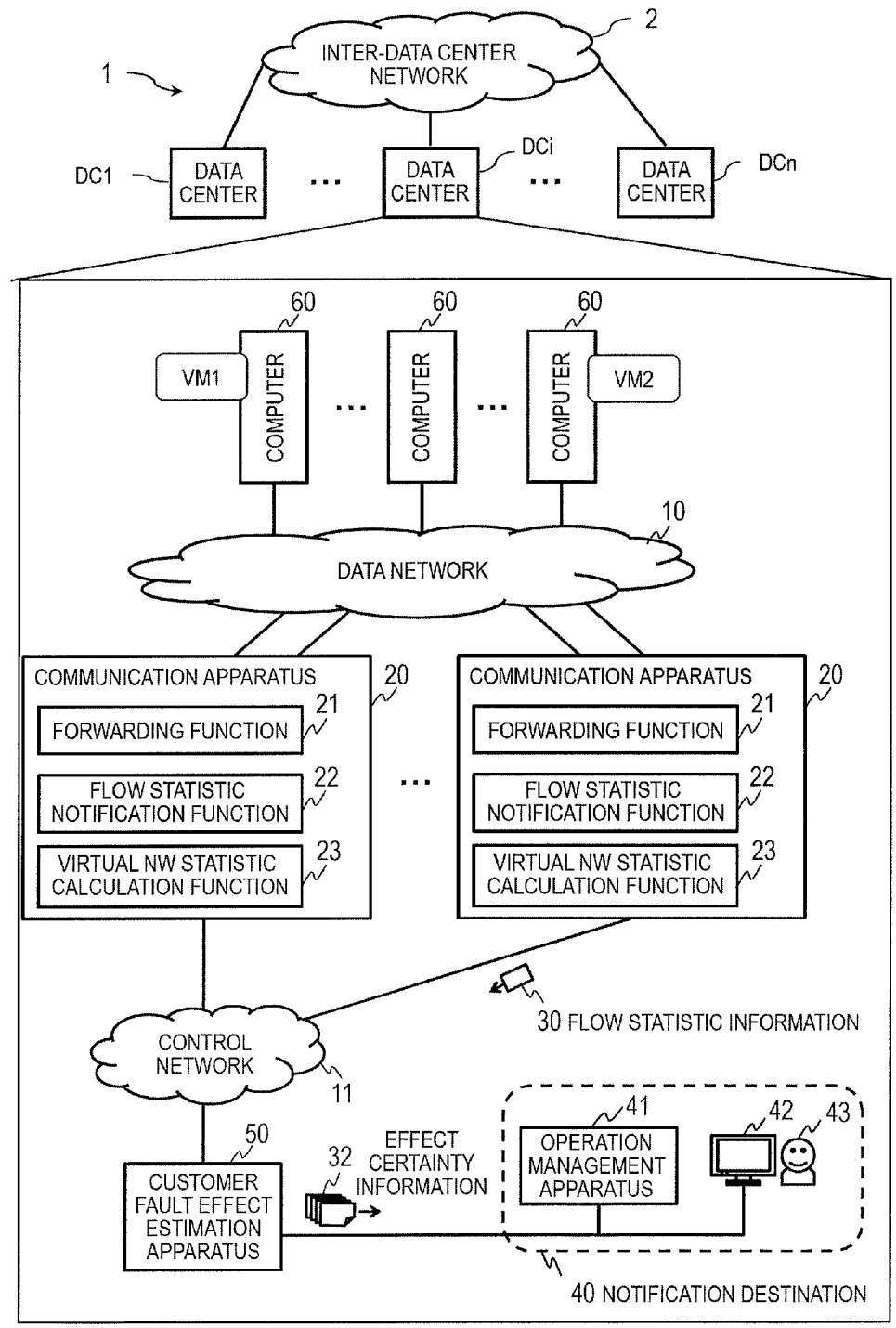
FIG. 2 is a descriptive view showing a system configuration example of a network system.

FIG. 2 is a descriptive view showing a system configuration example of a network system. The network system 1 is a system in which a plurality of data centers DC1 to DCn (n being an integer of 2 or greater) are connected through an inter-data center network 2 in a manner enabling communication.

In the system, the data center DCi (where 1≤i≤n) is connected through a data network 10 to one or more computers 60 and one or more communication apparatuses 20 in a manner enabling communication, and the communication apparatuses 20 and the management apparatus 50 are connected to each other through a control network 11 in a manner enabling communication. The computer 60 is connected to one or more communication apparatuses 20 in a manner enabling communication. The computer 60 is, for example, a server or a personal computer, and can perform communication in either direction through the data network 10.

The communication apparatus 20 is, for example, a relay apparatus such as a LAN switch or a router. The communication apparatus 20 includes one or more interfaces connected to the data network 10, and an interface connected to the control network 11. The communication apparatus 20 is not limited to being hardware, and may be software. Also, the data network 10 and the control network 11 may be the same network.

The communication apparatus 20 has a forwarding function 11, a flow statistic notification function 22, and a virtual NW statistic calculation function 23. The forwarding function 21 analyzes the flow received through a given interface of the communication apparatus 20, determines the interface to which the flow should be outputted according to rules set in advance, on the basis of flow characteristic information attained by the analysis, and outputs the flow to the determined interface.

The flow in the present embodiment refers to communication uniquely determined by the flow characteristic information. Also, the flow characteristic information indicates the "source MAC (Media Access Control) address" that is the address of the interface of the flow source, the "destination MAC address" that is the address of the interface that is the flow destination, the "frame type" indicating the type of network layer in an OSI (Open Systems Interconnection) reference model of the flow, the "source IP address" that is the IP address of the communication apparatus that is the flow source, the "IP protocol" indicating the type of transport layer in the OSI reference model when transmitting and receiving the flow, the "source port number" indicating the program to be the source of traffic from among a plurality of programs operated by the communication apparatus 20, the "destination port number" indicating the program to be the destination of the flow from among the plurality of programs operated by the communication apparatus 20, and the "virtual NW ID" indicating the virtual network to which the flow belongs. The forwarding function 21 acquires the flow characteristic information from the header portion of each packet constituting the flow.

The virtual network is a means of logically separating communications by adding an identifier to the communication, encapsulating the communication, or the like, and is realized by publicly known techniques such as VLAN, MPLS (Multiprotocol Label Switching), VXLAN, GRE (Generic Routing Encapsulation), and NVGRE (Network Virtualization using GRE), for example.

In the example of FIG. 1, for example, the virtual network is defined by the flow, which is a series of packets including a common virtual NW ID that are exchanged between the virtual machine VM1 and the virtual machine VM2 through the communication apparatus 20 constituting the data network 10. The virtual machine VM2 may be on an computer 60 in another data center DCj (j satisfying i≠j and 1≤j≤n; hereinafter referred to as the external data center DCj). The flow statistic notification function 22 notifies the management apparatus 50 of prescribed information pertaining to the flow passing through the communication apparatus 20 (sampling packet flow characteristic information or the number of packets that have passed per unit of flow time) as flow statistic information 30 through the control network 11.

The virtual NW statistic calculation function 23 is a function that counts the number of packets that have passed through per unit of flow time in each virtual network passing through the communication apparatus 20.

The forwarding function 21, the flow statistic notification function 22, and the virtual NW statistic calculation function 23 are all realized by existing techniques. For example, the forwarding function 21 is realized by the switching function of a LAN switch. The flow statistic notification function 22 is realized by the use of sFlow and IPFIX (IP Flow Information Export). The virtual NW statistic calculation function 23 is realized by using the counter function of the communication apparatus 20 having a resolution for each virtual network.

Figure 16:
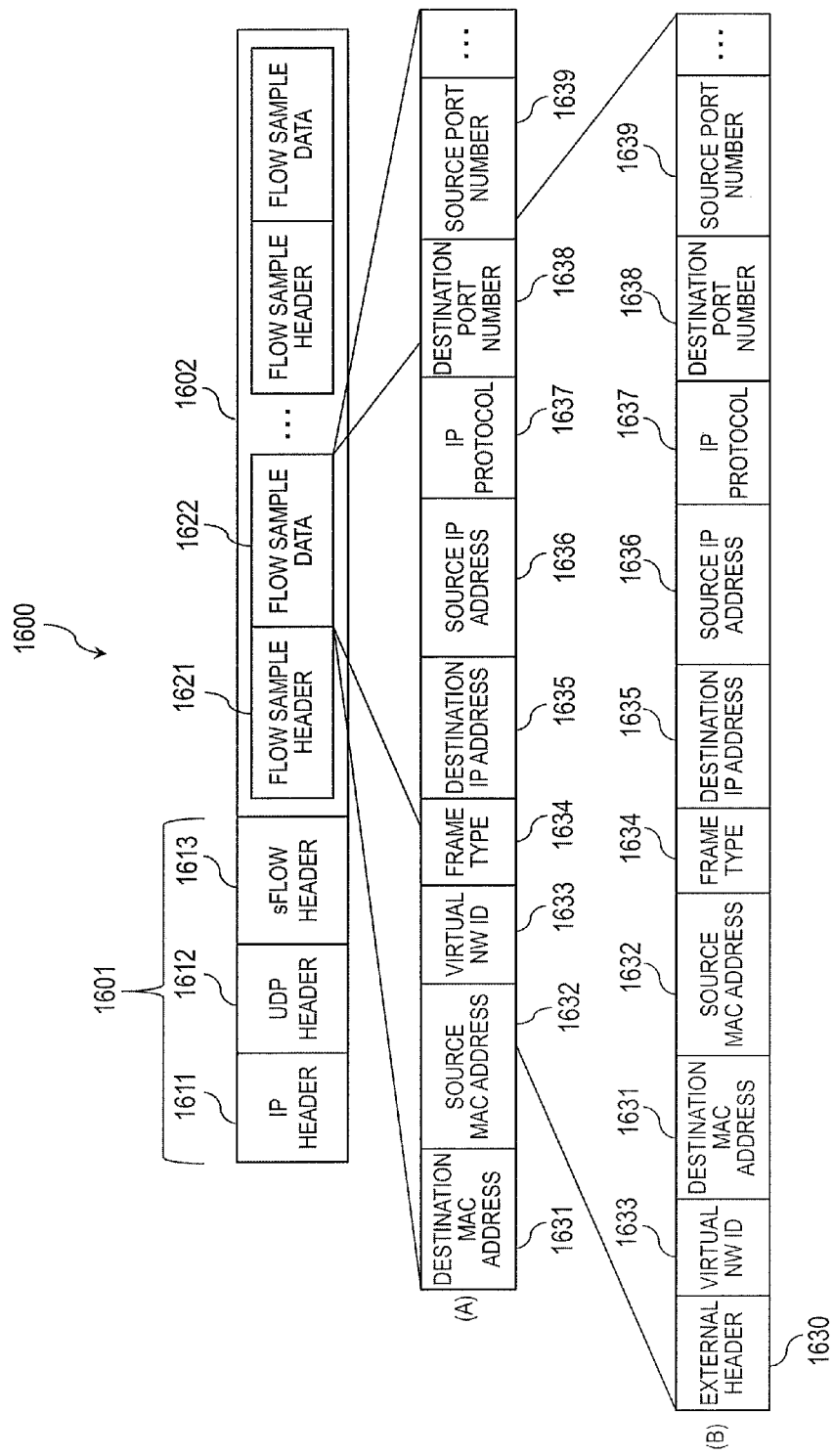
FIG. 16 is a descriptive view showing a format example of a sample packet.

Below, sFlow is assumed to be used for the flow statistic notification function 22, the flow statistic information 30 is assumed to use sFlow sampling for sample packet information. Format details of the flow statistic information 30 are shown in FIG. 16. The management apparatus 50 calculates the certainty that a customer is affected by a communication fault on the basis of the flow statistic information 30, and transmits the calculation results to a notification destination 40 as effect certainty information 32 to be mentioned later.

The notification destination 40 is a client terminal 42 operated by a manager 43 of the data center DCi, or an operation management apparatus 41 of the data center DCi. If the notification destination 40 is the client terminal 42, then when the client terminal 42 receives the effect certainty information 32 from the management apparatus 50, it displays the effect certainty of the fault for each customer as estimated by the management apparatus 50.

The effect certainty information 32 is information indicating the degree of certainty that a fault has affected the flow of each customer. In addition, the effect certainty information 32 may include information such as the degree of importance of each customer, the proportion of flows with a high degree of certainty of being affected by a fault among all flows of the customers, flow detail information for each customer, whether the communication apparatus where the fault has occurred has redundancy, and whether past communication patterns match the communication patterns immediately prior to the fault occurring. The flow detail information indicates the communication pattern representative period and flow characteristic information of each flow of the customer, the number of communication packets, and the presence or absence of periodicity The protocol used when the management apparatus 50 sends the effect certainty information 32 to the notification destination 40 may be a publicly known protocol such as HTTP (hypertext transfer protocol), or may be proprietary. Also, the data format of the effect certainty information 32 may be a publicly known format such as JSON (JavaScript Object Notation) or XML (extensible markup language), or may be proprietary.

Also, in the description below, the communication pattern indicates a group including a plurality of similar pieces of one-period data when the time series data for one period of flow is referred to as one-period data. The communication pattern representative period indicates one-period data that is representative in the communication pattern.

<Hardware Configuration Example of Management Apparatus 50>

Figure 3:
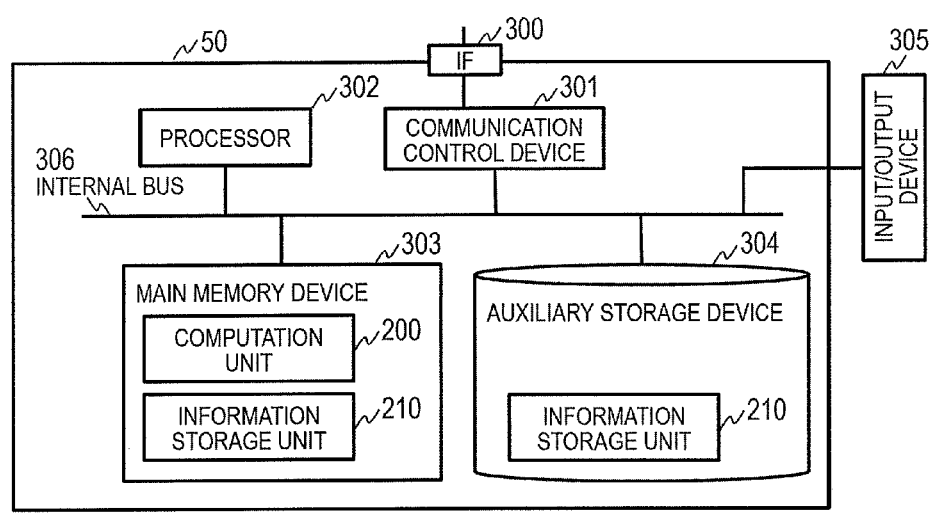
FIG. 3 is a block diagram for showing a hardware configuration example of the management apparatus.

FIG. 3 is a block diagram for showing a hardware configuration example of the management apparatus 50. The management apparatus 50 has a processor 302, a main memory device 303, an auxiliary storage device 304, a communication control device 301, and input/output devices 305. These are connected to each other through an internal bus 306.

The processor 302 is hardware that handles operation control of the entire management apparatus 50. The main memory device 303 is constituted of a semiconductor memory, for example, and temporarily stores various programs and control data. The main memory device 303 stores a group of programs included in the computation unit 200 to be described later with reference to FIG. 4 as well as a group of tables of an data store unit 210 to be described later with reference to FIG. 4.

The auxiliary storage device 304 is a storage device having a large storage capacity, and is a hard disk apparatus or an SSD (solid state drive), for example. The auxiliary storage device 304 stores various programs and data. Among the group of tables in the data store unit 210, information with few updates or views may be stored in the auxiliary storage device 304. The main memory device 303 and the auxiliary storage device 304 can be accessed by the processor 302.

The communication control device 301 is hardware having the function of controlling communications with each communication apparatus 20, and is connected to the control network 11 through the interface 300. The input/output devices 305 include input devices such as a keyboard and mouse to allow the user to input various operations, and an output device such as a liquid crystal display for displaying various information.

<Mechanical Configuration Example of Management Apparatus 50>

Figure 4:
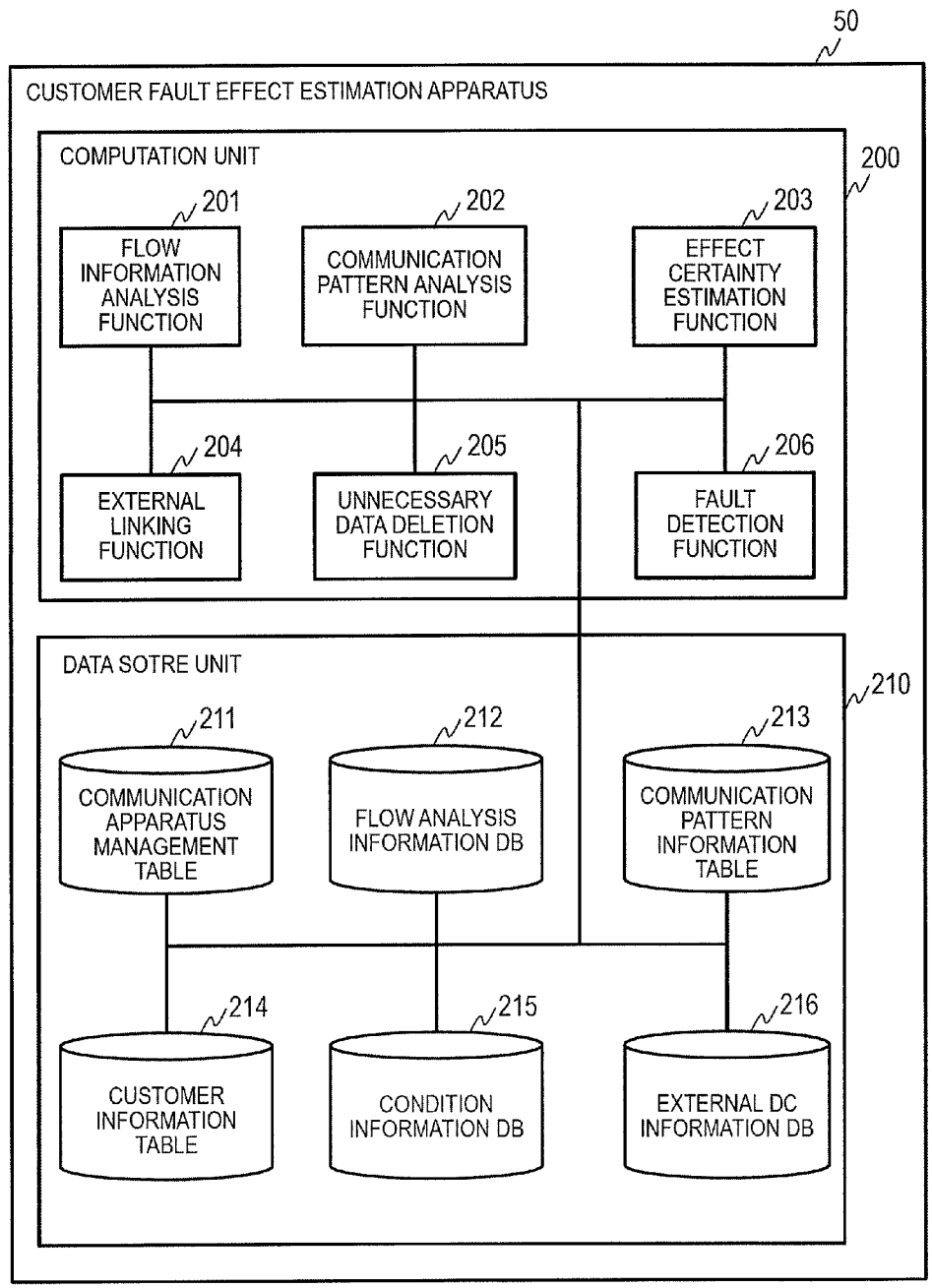
FIG. 4 is a block diagram showing a mechanical configuration example of the management apparatus.

FIG. 4 is a block diagram showing a mechanical configuration example of the management apparatus 50. The management apparatus 50 has the computation unit 200 and the data store unit 210. The computation unit 200 has a flow information analysis function 201, a communication pattern analysis function 202, an effect certainty estimation function 203, an external linking function 204, an unnecessary data deletion function 205, and a fault detection function 206. The functions 201 to 206 are realized by the processor 302 executing programs stored in the main memory device 303.

The flow information analysis function 201 analyzes the flow statistic information 30 transmitted from each communication apparatus 20 constituting the data network 10 through the control network 11. The flow information analysis function 201 analyzes the number of communication packets per unit flow time and the flow characteristic information of each flow in the data network 10. The flow information analysis function 201 stores the flow characteristic information and number of communication packets in a flow analysis information DB 212.

The communication pattern analysis function 202 calculates the communication pattern by analyzing the periodicity of each flow on the basis of the flow analysis information DB 212 and a condition information table 215, and then stores the calculated communication pattern in a communication pattern information table 213.

The effect certainty estimation function 203 calculates the effect certainty information 32, which is the degree of certainty that each customer has been affected by the fault when it occurs, on the basis of the communication pattern information table 213 and a customer information table 214, and sends the effect certainty information 32 to the notification destination 40.

The external linking function 204 shares time series data of the flow and fault information with the management apparatus 50 located between it and the external data center DCj, on the basis of an external DC information table 216. The protocol used by the external data center DCj when transmitting and receiving messages to/from the management apparatus 50 may be a publicly known protocol such as HTTP or proprietary. The data format may be a publicly known format such as JSON or XML, or may be proprietary.

The unnecessary data deletion function 205 deletes flow characteristic information and time series data included in the flow analysis information DB 212 on the basis of the condition information table 215 described later with reference to FIG. 13.

The fault detection function 206 monitors faults in the communication apparatuses 20 in the data center DCi as well as communication apparatuses 20 of the external data center DCj (hereinafter referred to as an external communication apparatus 20). The external communication apparatus 20 refers to a communication apparatus 20 located in the boundary between the internal network of the external data center DCj and the inter-data center network between the data center DCi and the external data center DCj. Also, the reason for monitoring faults in the external communication apparatus 20 of the external data center DCj is to enable estimation of the degree of certainty that a customer has been affected by a fault in a similar manner to the data center DCi even when there is a fault in the inter-data center network 2. An external fault monitoring apparatus having a function similar to the fault detection function 206 may be used instead of the fault detection function 206.

The data store unit 210 has a communication apparatus management table 211, a flow analysis information DB 212, a communication pattern information table 213, a customer information table 214, a condition information DB 215, and an external DC information DB 216. The tables 212 to 216 are realized by information stored in the main memory device 303, for example.

In the description below, the information stored in the data store unit 210 is stored in table format, but the information need not necessarily be expressed in a table-based data structure, and may be expressed as a data structure such as a list, DB, or a queue. In order to express the fact that the type of data structure does not matter, the word "information" may be used for tables, lists, DBs, queues, and the like. When describing the contents of the information, it is possible to use the terms "identification information," "identifier," "name," and "ID," and these terms are interchangeable.

The communication apparatus management table 211 is a data structure that identifies the communication apparatuses 20 present in the data network 10. Details of the communication apparatus management table will be described later with reference to FIG. 6.

The flow analysis information DB 212 stores flow analysis information (to be mentioned later with reference to FIGS. 8 and 9) indicating flow characteristics present in the data network 10.

The communication pattern information table 213 is a data structure that stores the flow communication pattern present in the data network 10.

The customer information table 214 is a data structure that defines the information of the customer using the data center DCi.

The condition information table 215 is a data structure that stores setting information used when detecting outliers from among the time series data or when combining a plurality of flows.

The external DC information table 216 is a data structure that stores information for accessing the external data center DCj and information shared with the external data center DCj.

At least one of the flow information analysis function 201, the communication pattern analysis function 202, the external linking function 204, the unnecessary data deletion function 205, and the fault detection function 206 may be present in an external apparatus that can communicate with the management apparatus 50. Also, the data store unit 210 may have an external apparatus that can communicate with the management apparatus 50.

<Configuration Example of Data Center DCi and Between Data Centers DCi, DCj>

Figure 5:
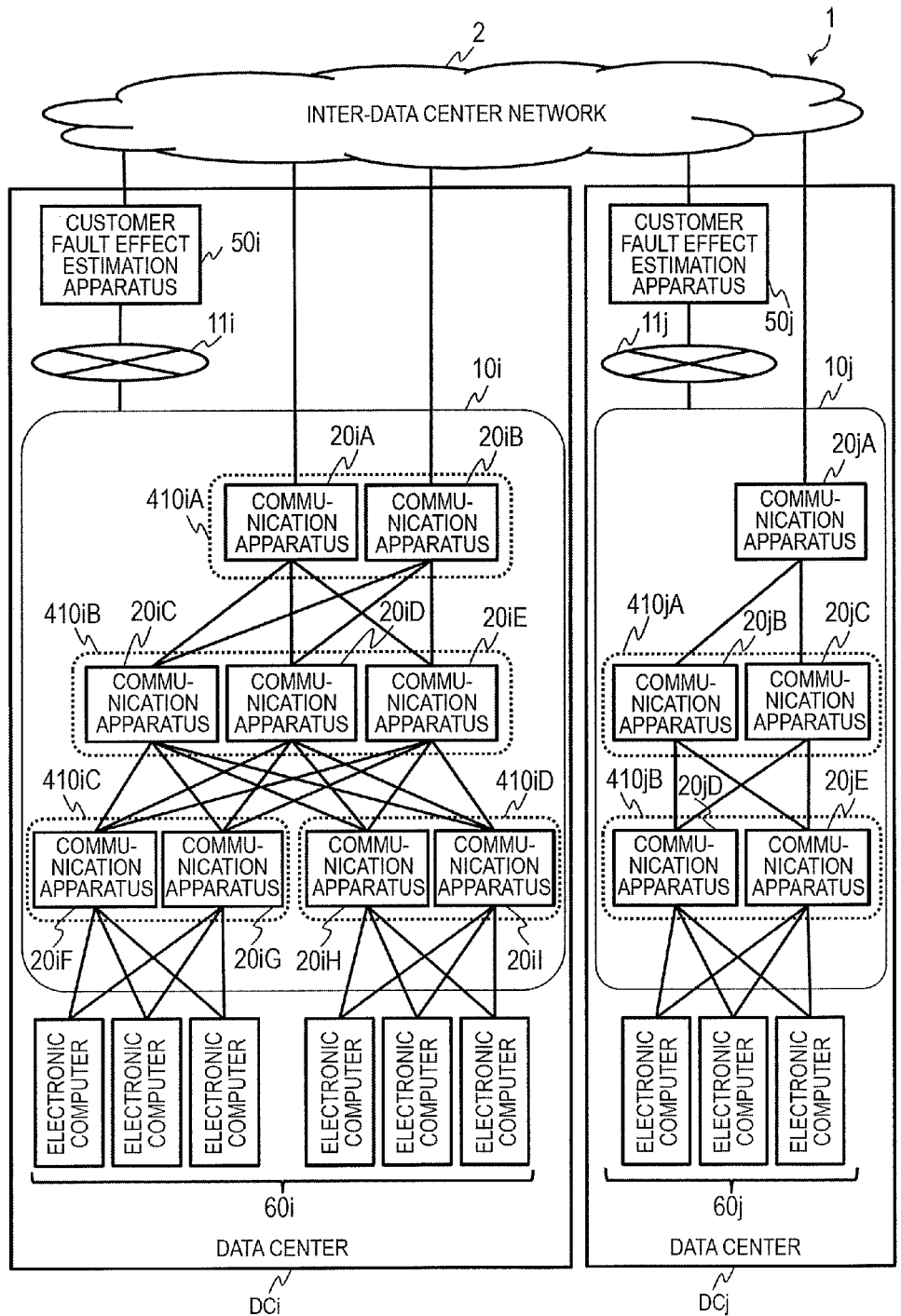
FIG. 5 is a descriptive view showing a detailed configuration example of the data center and the configuration between the data centers.

FIG. 5 is a descriptive view showing a detailed configuration example of the data center DCi and the configuration between the data centers DCi and DCj. However, the environment run by the management apparatus 50 is not limited to the configuration of the data centers DCi and DCj shown in FIG. 5. The reference characters of components in the data centers DCi and DCj are indicated with "i" and "j" as in the computers 60$i$ and 60$j$. If no distinction is being made, then the "i" or "j" is omitted as in "communication apparatus 20". Also, there are a plurality of communication apparatuses 20 in the data centers DCi and DCj, and thus, in order to distinguish these, capital letter suffixes are attached to the reference characters, such as the communication apparatuses 20$i$A and 20$i$B and the communication apparatuses 20$j$A and 20$j$B. If no distinction is being made, then the capital letter suffix is omitted as in "communication apparatuses 20$i$ and 20$j$".

The data center DCi and the data center DCj are connected through the inter-data center network 2, and the data center DCi and the data center DCj have the management apparatuses 50$i$ and 50$j$, respectively. Each communication apparatus 20$i$ (20$j$) and computer 60$i$ (60$j$) are connected by the data network 10$i$ (10$j$).

In some cases the customer system is constituted of a plurality of data centers DC such as the data centers DCi and DCj. Such a customer system generates a flow across the data centers DCi and DCj, and thus, within the respective data centers DCi and DCj, it is possible to improve the accuracy of estimating the effect of communication faults as a result of the management apparatuses 50$i$ and 50$j$ sharing flow information and fault information. In the present embodiment, the information of a plurality of data centers DC is shared to improve the accuracy of estimating the effect of communication faults. Also, the network system 1 across the data centers DCi and DCj is affected by faults in the inter-data center network 2. Thus, in the present embodiment, the management apparatus 50 can also handle faults in the inter-data center network 2 by monitoring whether or not the inter-data center network 2 is up.

Also, in each data center DCi and DCj, the communication apparatuses 20 other than the communication apparatus 20$j$A have a redundant configuration 410 in order to improve availability or distribute the load. If the communication apparatus 20 has a redundant configuration 410, if a fault occurs in a communication apparatus 20, then the path is changed such that the flow that was passing through the communication apparatus 20 is passed through another redundant communication apparatus 20. Thus, even if a fault were to occur in the communication apparatus 20, in some cases the fault does not affect the flow. In the present embodiment, the management apparatus 50 determines whether the communication apparatus 20 where the fault occurred has redundancy, and adds information on the presence of redundancy to the fault effect certainty information.

<Example of Content Stored in Each Table>

Next, an example of content stored in each table stored in the data store unit 210 will be described. In the description below, the value of AA field xxx (AA being the field name and xxx being a reference character) is expressed as AA xxx. For example, the value of a communication apparatus ID field 601 is recorded as "communication apparatus ID 601".

Figure 6:
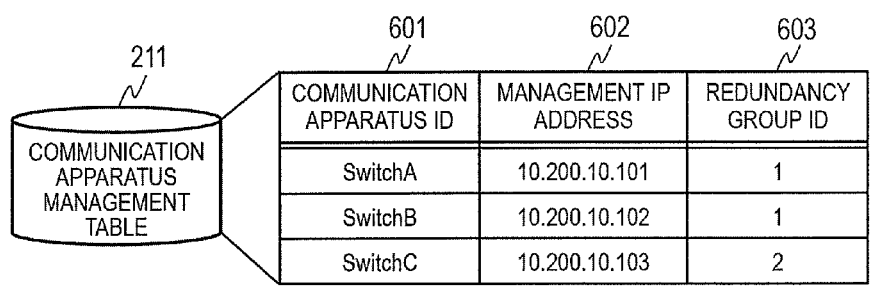
FIG. 6 is a descriptive view showing an example of the communication apparatus management table.

FIG. 6 is a descriptive view showing an example of the communication apparatus management table 211. The communication apparatus management table 211 stores configuration information of the communication apparatuses 20 present in the data network 10. The manager 43 of the data center DCi operates the input/output devices 26 and sets in advance the configuration information. However, a configuration may adopted such that the manager 43 can set the configuration information through the control network 11.

The communication apparatus management table 211 has a communication apparatus ID field 601, a management IP address field 602, and a redundancy group ID field 603, and an entry defining the configuration information of the communication apparatus 20 is formed by the values of each field. In other words, in the communication apparatus management table 211, one entry row corresponds to one communication apparatus 20 in the data network 10.

The communication apparatus ID field 601 is a storage region into which the communication apparatus IDs 601 are stored as values. The communication apparatus ID 601 is identification information that uniquely identifies the communication apparatus 20 within the data center DCi.

The management IP address field 602 is a storage region into which the management IP addresses 602 are stored as values. The management IP address 602 is the IP address of the communication apparatus 20 identified by the communication apparatus ID 601. The management IP address 602 is used when exchanging control information with other communication apparatuses 20. The management IP address 602 is used when identifying the communication apparatus 20 to be the source of the sFlow, and when acquiring from other communication apparatuses 20 the total number of packets in each virtual network within a given period (see SP31 in FIG. 19).

The redundancy group ID field 603 is a storage region into which the redundancy group IDs 603 are stored as values. The redundancy group ID 603 is information identifying the manner in which the communication apparatus 20 is given redundancy. In the group of communication apparatuses 20 given redundancy, the same redundancy group ID 603 is assigned. In the example of FIG. 6, the same value "1" is assigned as the redundancy group ID 603 to the communication apparatus 20 with the communication apparatus ID 601 of "SwitchA" and the communication apparatus 20 with the communication apparatus ID 601 of "SwitchB". Therefore, the communication apparatus 20 with the communication apparatus ID 601 of "SwitchA" and the communication apparatus 20 with the communication apparatus ID 601 of "SwitchB" have a redundant configuration.

Figure 7:
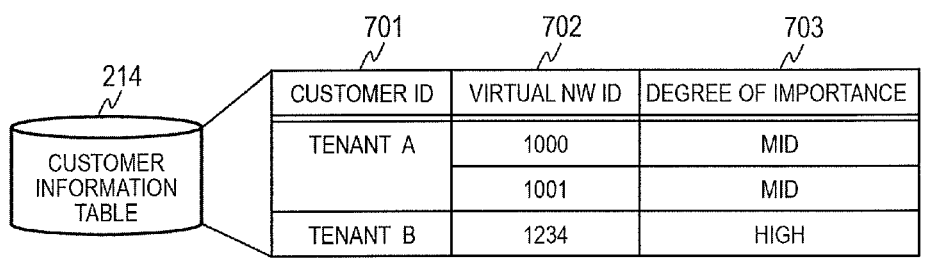
FIG. 7 is a descriptive view showing an example of the customer information table.

FIG. 7 is a descriptive view showing an example of the customer information table 214. The customer information table 214 retains the information of the customer using the data center DCi and associates each flow with the customer. In the present embodiment, the association between each flow and customer is assigned a virtual NW ID. This is due to the fact that in typical cloud services, one virtual network is not shared by multiple customers. The manager 43 of the data center DCi operates the input/output devices 26 and sets in advance the customer information included in the customer information table 214. However, a configuration may adopted such that the manager 43 can set the customer information through the control network 11.

The customer information table 214 has a customer ID field 701, a virtual NW ID field 702, and a degree of importance field 703, and an entry defining the customer information is formed by the values of each field. In other words, in the customer information table 214, one entry row corresponds to one virtual network.

The customer ID field 701 is a storage region into which the customer IDs 701 are stored as values. The customer ID 701 is identification information that uniquely identifies the customer using the computer resources and applications of the data center DCi. The customer ID 701 is unique among the plurality of data centers DC managed by the management apparatus 50.

The virtual NW ID field 702 is a storage region into which the virtual NW IDs 702 are stored as values. The virtual NW ID 702 is identification information that uniquely identifies the virtual network used by the customer identified by the customer ID 701.

The degree of importance field 703 is a storage region into which degrees of importance 703 are stored as values. The degree of importance 703 is an indicator that indicates for each virtual NW ID 702 the degree of risk for when a customer identified by the customer ID 701 is affected by a fault, and is expressed by "high", "mid", or "low", for example. The degree of importance 703 is used as reference information for determining the order of priority for a manager 43 of the data center DCi handling a fault, according to the degree of certainty that a fault will affect a customer.

FIGS. 8 and 9 are descriptive views showing one example of the flow analysis information DB 212. The flow analysis information DB 212 stores flow analysis information generated as a result of the flow information analysis function 201 analyzing the flow statistic information 30. Specifically, the flow analysis information DB 212 stores a flow characteristic information table 800 and a time series data table 900 as flow analysis information, for example.

FIG. 8 is a descriptive view showing an example of the flow characteristic information table 800. The flow characteristic information table 800 stores the flow characteristic information of a flow in the data network 10. The flow characteristic information is used when referencing a virtual network belonging to each flow or when generating time series data from an sFlow sample. The flow characteristic information table 800 has a flow ID field 801, a destination MAC address field 802, a source MAC address field 803, a frame type field 804, a destination IP address field 805, a source IP address field 806, an IP protocol field 807, a destination port number field 808, a source port number field 809, and a virtual NW ID field 810, and the values of the fields constitute an entry defining the flow characteristic information. In the flow characteristic information table 800, one entry row corresponds to one flow.

The flow ID field 801 is a storage region into which the flow IDs 801 are stored as values. The flow ID 801 is identification information that uniquely identifies the flow. The flow ID 801 is unique within the data center DCi.

The destination MAC address field 802 is a storage region into which the destination MAC addresses 802 are stored as values. The source MAC address field 803 is a storage region into which the source MAC addresses 803 are stored as values. The frame type field 804 is a storage region into which the frame types 804 are stored as values. The destination IP address field 805 is a storage region into which the destination IP addresses 805 are stored as values. The source IP address field 806 is a storage region into which the source IP addresses 806 are stored as values. The IP protocol field 807 is a storage region into which the IP protocols 807 are stored as values. The destination port number field 808 is a storage region into which the destination port numbers 808 are stored as values. The source port number field 809 is a storage region into which the source port numbers 809 are stored as values. The virtual NW ID field 810 is a storage region into which the virtual NW IDs 810 are stored as values.

FIG. 9 is a descriptive view showing an example of the time series data table 900. The time series data table 900 stores time series data indicating the number of packets according to the time of each flow. The time series data is used when calculating the communication pattern or when ascertaining the real time data prior to the occurrence of the fault. The time series data table 900 has a flow ID field 901, a communication apparatus ID field 902, a calculation time field 903, an estimated packet number field 904, and an acquisition source DC ID field 905, and an entry defining the time series data is formed by the values of each field. In other words, in the time series data table 900, one row corresponds to the data group of one flow at one time acquired in the data center DCi.

The flow ID field 901 is a storage region into which the flow IDs 901 are stored as values. The flow ID 901 is identification information that uniquely identifies the flow. The flow ID 901 is unique within the data center DCi. A plurality of entries exist for one flow ID 901 due to differences in the calculation time 903.

The communication apparatus ID field 902 is a storage region into which the communication apparatus IDs 902 are stored as values. The communication apparatus ID 902 is identification information that uniquely identifies the communication apparatus 20 within the data center DCi. Specifically, the communication apparatus ID 902 is for the communication apparatus 20 that outputted the flow characteristic information of a flow identified by the flow ID 901 through packet sampling at the calculation time 903 of the flow.

The calculation time field 903 is a storage region into which the calculation times 903 are stored as values. The calculation time 903 is the time at which the flow information analysis function 201 calculates the time series data.

The estimated packet number field 904 is a storage region into which estimated numbers of packets 904 are stored as values. The estimated number of packets 904 is the traffic that is the estimated number of packets in a flow that passes through the data network 10i from when the previous time series data was calculated to when the current time series data is calculated.

The acquisition source DC ID field 905 is a storage region into which the acquisition source DC IDs 905 are stored as values. The acquisition source DC ID 905 is identification information that uniquely identifies the external data center DCj for when the time series data is acquired from the external data center. Entries in which the acquisition source DC ID field 905 is blank (indicated as "-") indicate time series data acquired in the same data center DCi.

FIG. 10 is a descriptive view showing an example of the communication pattern information table 213. The communication pattern information table 213 stores communication pattern information including flow period information present in the data network 10. The communication pattern information is generated as a result of the communication pattern analysis function 202 analyzing the flow analysis information DB 212.

The communication pattern information table 213 has, as fields, a flow ID field 1001, a communication path field 1002, a periodicity field 1003, a period field 1004, a pattern ID field 1005, and a data interval field 1006, and an entry defining the communication pattern information is formed by the values of each field. In other words, in the communication pattern information table 213, each row corresponds to communication pattern information. Specifically, the flow period information is constituted of the flow ID 1001, the periodicity 1003, and the period 1004.

The flow ID field 1001 is a storage region into which the flow IDs 1001 are stored as values. The flow ID 1001 is identification information that uniquely identifies the flow. The flow ID 1001 is unique within the data center DCi. If the period is calculated with a plurality of flows combined, then a plurality of flow IDs 1001 are stored in each entry.

The communication path field 1002 is a storage region into which the communication paths 1002 are stored as values. The communication path 1002 is a communication path ID that is an identifier of the communication apparatus 20 through which the flow identified by the flow ID 1001 passes.

The periodicity field 1003 is a storage region into which the periodicities 1003 are stored as values. The periodicity 1003 is information indicating the presence or absence of periodicity in each flow identified by the flow ID 1001, and is one of two values: "present" or "absent". If the periodicity is "present", then the communication pattern of the pattern ID 1005 signifies a waveform that repeats at the period 1004 during each data interval 1006.

The period field 1004 is a storage region into which the periods 1004 are stored as values. The period 1004 is the time (seconds) of one period of each flow identified by the flow ID 1001.

The pattern ID field 1005 is a storage region into which the pattern IDs 1005 are stored as values. The pattern ID 1005 is identification information that uniquely identifies the communication pattern of each flow identified by the flow ID 1001. There are sometimes a plurality of communication patterns for each flow having one periodicity 1003.

The data interval field 1006 is a storage region into which the data intervals 1006 are stored as values. The data interval 1006 is information defining the interval of the communication pattern identified by the pattern ID 1005. If the periodicity 1003 is "present", then each row within the data interval field 1006 indicates the period.

The time series data in which the estimated numbers of packets 904 at the calculation time 903 corresponding to the data interval 1006 of the pattern ID 1005 are arranged in chronological order is the communication pattern indicating periodic changes over time of the traffic (estimated number of packets 904) of the flow.

Figure 11:
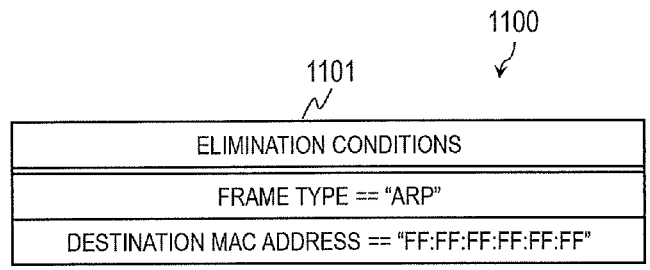
FIG. 11 is a descriptive view showing an example of the flow elimination condition.
Figure 12:
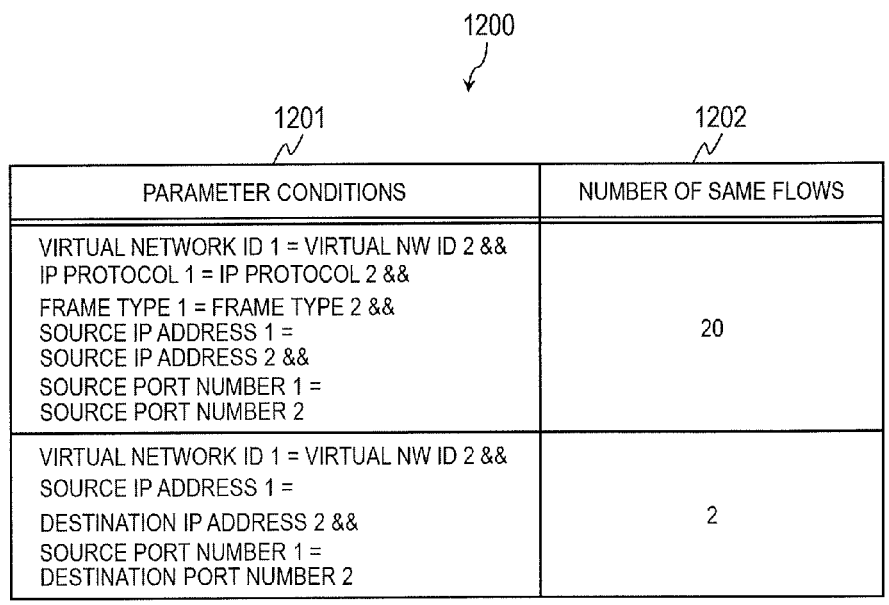
FIG. 12 is a descriptive view showing an example of the flow combination condition.

FIGS. 11 and 12 are descriptive views showing one example of the condition information DB 215. The condition information DB 215 stores setting information used when detecting outliers from among the time series data or when combining a plurality of flows. Specifically, the condition information DB 215 stores a flow elimination condition 1100 and a flow combination condition 1200, for example. The flow elimination condition 1100 and the flow combination condition 1200 are specifically set in advance by the manager 43 of the data center DCi using the input/output devices 26. However, a configuration may adopted such that the manager 43 can set these through the control network 11.

FIG. 11 is a descriptive view showing an example of the flow elimination condition 1100. The flow elimination condition 1100 is information defining a condition of flow characteristic information (entry in flow characteristic information table 800) to be eliminated as an outlier, and is used for analysis of the communication pattern. The flow elimination condition 1100 retains elimination conditions 1101. The elimination conditions 1101 store conditions of the flow characteristic information that is an outlier. The elimination conditions 1101 are expressed as a component of the flow characteristic information (at least one of values 802 to 810 of the flow characteristic information table 800, excluding the flow ID 801), a given parameter, a comparative operator in the C programming language, and a logic operator, for example. As an example, if there is a condition "frame type=="ARP"", then this indicates that the communication pattern is not calculated for a flow that is defined by an entry where the frame type 804 is "ARP" among the entries in the flow characteristic information table 800.

FIG. 12 is a descriptive view showing an example of the flow combination condition 1200. The flow combination condition 1200 is information defining conditions for combining a plurality of flows for which no periodicity is seen, and is used for analysis of the communication pattern. The flow combination condition 1200 has a parameter condition 1201 and a number of same flows 1202. This is in order to designate a combination condition of "combine flows if the flows have the same source IP address 806 and there are 20 or more flows without the periodicity 1003".

The parameter condition 1201 stores conditions for flow characteristic information that much match when combining a plurality of flows. Specifically, the parameter condition 1201 is expressed as a component of the flow characteristic information (at least one of values 802 to 810 of the flow characteristic information table 800, excluding the flow ID 801), a comparative operator in the C programming language, and a logic operator, for example. As an example, when there is a condition that "source IP address 1==destination IP address 2", this indicates that in each entry where the flow ID 801 in the flow characteristic information table 800 is "A" (hereinafter, "flow A" or "B" (hereinafter, "flow B"), if the source IP address 806 of the flow A is the destination IP address 805, then the flow A and the flow B can be combined.

The number of same flows 1202 stores information of at least how many flows are necessary that satisfy the condition of the parameter condition 1201 and that have no periodicity 1003.

FIGS. 13 to 15 are descriptive views showing one example of the external DC information DB 216. The external DC information DB 216 stores information for accessing the external data center DCj and information shared with the external data center DCj. The external DC information DB 216 is constituted of an external DC management information table 1300, an external DC fault table 1400, and an external DC customer information table 1500.

FIG. 13 is a descriptive view showing an example of the external DC management information table 1300. The external DC management information table 1300 stores information for accessing the external data center DCj. The external DC management information table 1300 is used for fault monitoring (SP13) to be mentioned later, for example.

The external DC management information table 1300 has a DC ID field 1301, a fault estimation system IP address field 1302, and an external IP address field 1303, and an entry defining the information for accessing the external data center DCj is constituted of the values of the fields. The external DC management information table 1300 is specifically set in advance by the manager 43 of the data center DCi using the input/output devices 26. However, a configuration may adopted such that the manager 43 can set this through the control network 11.

The DC ID field 1301 is a storage region into which the DC IDs 1301 are stored as values. The DC ID 1301 is identification information that uniquely identifies the external data center DCj other than the data center DCi.

The fault estimation system IP address field 1302 is a storage region into which the fault estimation system IP addresses 1302 are stored as values. The fault estimation system IP address 1302 is a management IP address of the management apparatus 50 in the external data center DCj identified by the DC ID 1301, and is used in order to share information with the management apparatus 50 in each data center DC.

The external IP address field 1303 is a storage region into which the external IP addresses 1303 are stored as values. The external IP address 1303 is a management IP address of the external communication apparatus in the external data center DCj identified by the DC ID 1301, and is used in order to monitor whether or not the inter-data center network 2 is running. The external communication apparatus is a communication apparatus 20j that is in the external data center DCj and is directly connected to the inter-data center network 2. In the example of FIG. 5, the communication apparatus 20jA is an external communication apparatus.

FIG. 14 is a descriptive view showing an example of the external DC fault table 1400. The external DC fault table 1400 stores fault information generated in the external data center DCj. The external DC fault table 1400 is used in order to determine that time series data of a flow affected by a fault in the external data center DCj is an outlier that may cause false detection, and delete the time series data when deleting unnecessary data.

The external DC fault table 1400 has as values a DC ID field 1401, a fault occurrence time field 1402, and a fault recovery time field 1403, and an entry defining the fault information of the external data center DCj is constituted of the values of the fields.

The DC ID field 1401 is a storage region into which the DC IDs 1401 are stored as values. The DC ID 1401 is identification information that uniquely identifies the external data center DCj other than the data center DCi where a fault has occurred, or that has recovered from a fault.

The fault occurrence time field 1402 is a storage region into which the fault occurrence times 1402 are stored as values. The fault occurrence time 1402 is the time at which a fault has occurred in the data center DCj identified by the DC ID 1401.

The fault recovery time field 1403 is a storage region into which the fault recovery times 1403 are stored as values. The fault recovery time 1403 is the time at which the data center DCj identified by the DC ID 1401 recovered from a fault.

FIG. 15 is a descriptive view showing an example of the external DC customer information table 1500. The external DC customer information table 1500 stores common flow information that is in common between the external data center DCj and the data center DCi. The external DC customer information table 1500 is used for acquiring time series data in the external data center DCj.

The external DC customer information table 1500 has a DC ID field 1501, a stored customer ID field 1502, and a flow ID field 1503, and an entry defining the common flow information is formed by the values of each field.

The DC ID field 1501 is a storage region into which the DC IDs 1501 are stored as values. The DC ID 1501 is identification information that uniquely identifies the external data center DCj other than the data center DCi.

The stored customer ID field 1502 is a storage region into which the stored customer IDs 1502 are stored as values. The stored customer ID 1502 is identification information that uniquely identifies the customer in common between the external data center DCj and the data center DCi identified by the DC ID 1501.

The flow ID field 1503 is a storage region into which the flow IDs 1503 are stored as values. The flow ID 1503 is identification information that uniquely identifies the flow in common between the external data center DCj and the data center DCi identified by the DC ID 1501.

<Customer Fault Effect Estimation Sequence>

Next, a customer fault effect estimation sequence will be described. The customer fault effect estimation sequence is a sequence for estimating the effect of a fault on a customer by analyzing the flow statistic information 30 transmitted from the communication apparatus 20. The flow statistic information 30 is an sFlow sample packet, for example.

FIG. 16 is a descriptive view showing a format example of a sample packet. A sample packet 1600 has a header portion 1601 and data portion 1602. The header portion 1601 has an IP header 1611, a UDP (User Datagram Protocol) header 1612, and an sFlow header 1613. The data portion 1602 includes a combination of a flow sample header 1621 and flow sample data 1622 for each flow.

The flow sample data 1622 is flow statistic information 30 shown in FIG. 2. The flow sample data 1622 has two types of formats (A) and (B), for example. (A) is a format example of the flow sample data 1622 for when the virtual network is formed by VLAN. (B) is a format example of the flow sample data 1622 for when the virtual network is formed by VxLAN. The difference between (A) and (B) is in the presence or absence of an external header 1630 or the data referenced as the virtual NW ID 1636, for example. Both formats (A) and (B) have a destination MAC address 1631, a source MAC address 1632, a virtual NW ID 1633, a frame type 1634, a destination IP address 1635, a source IP address 1636, an IP protocol 1637, a destination port number 1638, and a source port number 1639. The destination MAC address 1631 to the source port number 1639 are stored in the flow characteristic information table 800 as flow characteristic information.

Figure 17:
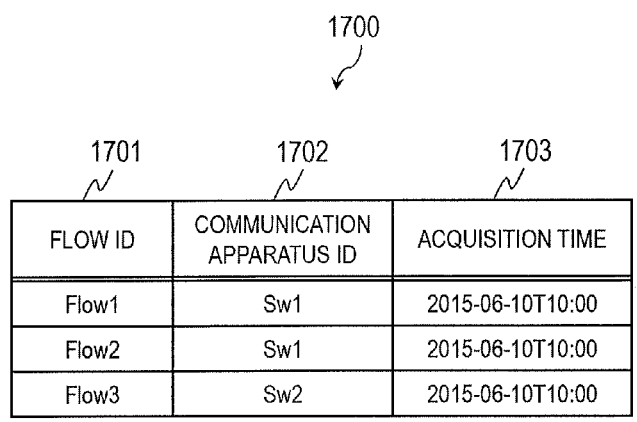
FIG. 17 is a descriptive view showing an example of the flow statistic information analysis result table.

FIG. 17 is a descriptive view showing an example of the flow statistic information analysis result table. The flow statistic information analysis result table 1700 is stored in the flow analysis information DB 212. The flow statistic information analysis result table 1700 is a table storing analysis results of the flow statistic information 30 (flow sample data 1622). The flow statistic information analysis result table 1700 has a flow ID field 1701, a communication apparatus ID field 1702, and an acquisition time field 1703, and an entry defining the analysis results is formed for each flow by the values of each field.

The flow ID field 1701 is a storage region into which the flow IDs 1701 are stored as values. The flow ID 1701 is identification information that uniquely identifies the flow, and corresponds to the flow characteristic information included in the sample packet 1600.

The communication apparatus ID field 1702 is a storage region into which the communication apparatus IDs 1702 are stored as values. The communication apparatus ID 1702 is identification information that uniquely identifies the communication apparatus 20 within the data center DCi. Specifically, the communication apparatus ID 1702 is identification information for the communication apparatus 20 that transmitted the sample packet 1600 in the flow identified by the flow ID 801. Specifically, for example, the communication apparatus ID 1702 is the communication apparatus ID 601 corresponding to the management IP address 602 matching the source IP address included in the IP header 1611 of the sample packet 1600.

The acquisition time field 1703 is a storage region into which the acquisition times 1703 are stored as values. The acquisition time 1703 is the time at which the sample packet 1600 is received from the communication apparatus 20 and the flow statistic information 30 (flow sample data 1622) is acquired.

Figure 18:
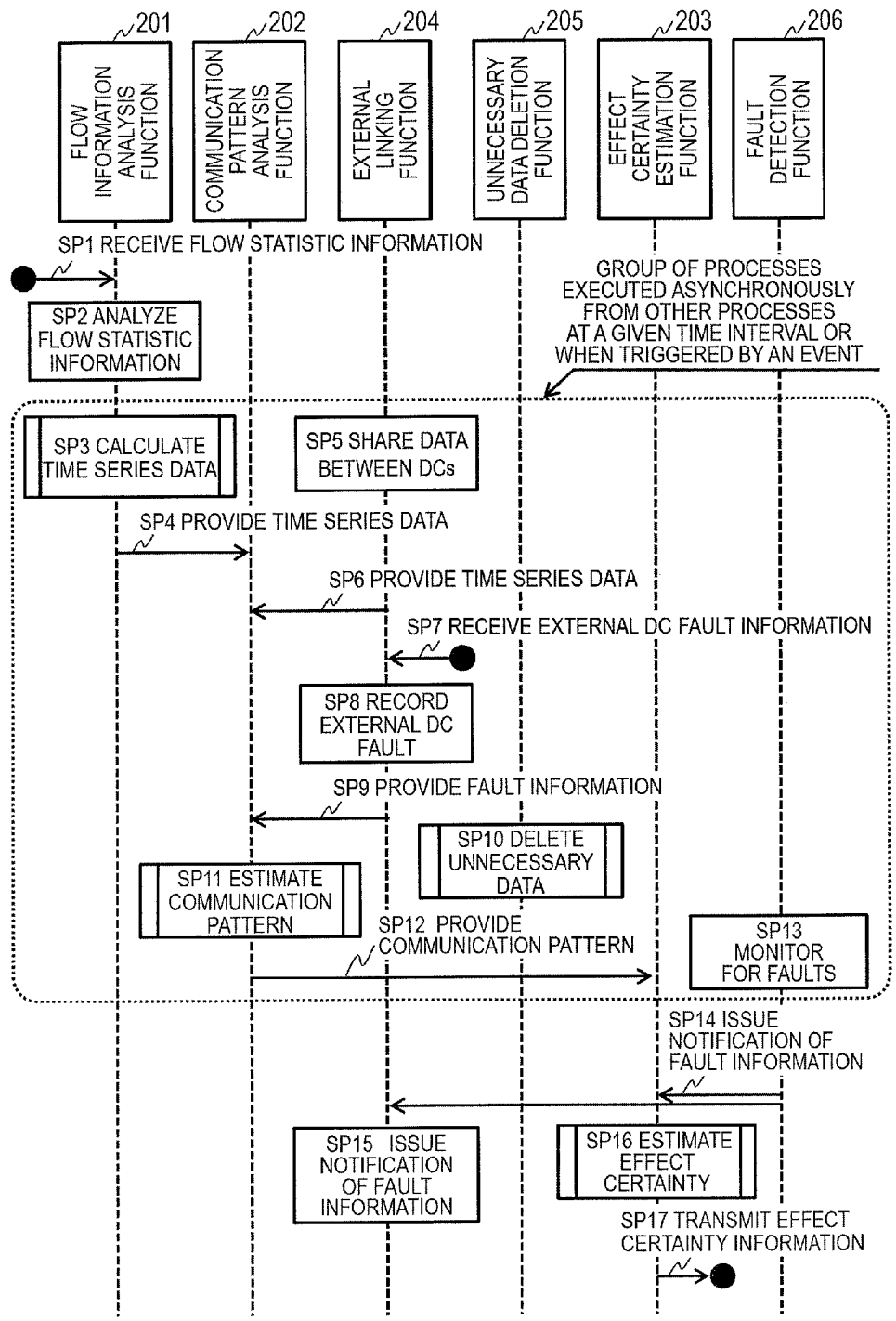
FIG. 18 is a descriptive view showing an example of the customer fault effect estimation sequence.

FIG. 18 is a descriptive view showing an example of the customer fault effect estimation sequence. The example of the customer fault effect estimation sequence shows a process flow from when the sample packet 1600 is received from the communication apparatus 20 and the flow statistic information (flow sample data 1622) is acquired from the sample packet 1600, to when the fault effect certainty is estimated for each customer when a fault occurs in the management apparatus 50 and the fault effect information is transmitted. The processes encircled by the dotted line in FIG. 18 (SP3 to SP13) are processes executed at a given time interval or by being triggered by an event, for example.

When the management apparatus 50 acquires the flow statistic information 30 in the sample packet 1600 from the communication apparatus 20 (SP1), first the flow information analysis function 201 performs analysis of the flow statistic information (SP2). The flow statistic information analysis (SP2) is specifically a process in which, for example, the flow statistic information 30 (flow sample data 1622) is analyzed and the characteristics of the flow in the data center DCi are ascertained, and this step is performed by a publicly known technique. In the present embodiment, the flow statistic information 30 is an sFlow sample packet, and thus, the flow statistic information analysis (SP2) is a process for parsing the sFlow sample.

Specifically, for example, during the flow statistic information analysis (SP2) the flow information analysis function 201 inputs the flow statistic information 30 (flow sample data 1622) in a packet analysis program that can handle the sample packet 1600. The flow information analysis function 201 acquires the flow characteristic information included in the flow statistic information 30 (flow sample data 1622) for each flow. The flow information analysis function 201 issues the flow ID 801 and associates the flow ID 801 with the acquired flow characteristic information, and generates an entry in the flow characteristic information table 800 of FIG. 8. If an entry with matching flow characteristic information is already present in the flow characteristic information table 800, then the flow information analysis function 201 does not generate an entry.

Also, the flow information analysis function 201 stores the issued flow ID 801 as the flow ID 1701 in the flow ID field 1701 of the flow information analysis result table 1700. Also, the flow information analysis function 201 refers to the communication apparatus ID 211, and identifies the management IP address 602 matching the source IP address included in the IP header 1611 of the sample packet 1600 and identifies the communication apparatus ID 601 corresponding to the identified management IP address. The flow information analysis function 201 stores the identified communication apparatus ID 601 as the communication apparatus ID 1702 in the communication apparatus ID field 1702 in the same entry as the flow ID 1701 stored as described above.

Also, the flow information analysis function 201 receives the sample packet 1600 from the communication apparatus 20 for the flow identified by the flow ID 801 stored as the flow ID 1701, and stores the time at which the flow statistic information (flow sample data 1622) was acquired in the acquisition time field 1703 as the acquisition time 1703. As a result, an entry is generated in the flow statistic information analysis result table 1700.

As a result, the flow information analysis function 201 ends the flow statistic information analysis (SP2). The entry in the flow statistic information analysis result table 1700 is stored in the main memory device 303 until time series data calculation (SP3) to be mentioned later is executed, and the entry is deleted by the flow information analysis function 201 after the time series data calculation (SP3) is completed.

Next, the flow information analysis function 201 performs time series data calculation at a given interval (such as every 10 minutes, for example) (SP3). Details of the time series data calculation (SP3) will be mentioned later with reference to FIG. 19. The calculated time series data is an entry in each flow of the time series data table 900 shown in FIG. 9. The flow information analysis function 201 provides the calculated time series data to the communication pattern analysis function 202. The time series data is used for communication pattern estimation (SP11).

Also, the external linking function 204 performs data sharing between DCs (SP5). The sharing of data between DCs is a process for the purpose of sharing between a plurality of data centers DC the time series data of a flow crossing between the data center DCi to which the management apparatus 50i having the external linking function 204 belongs, and the external data center DCj (referred to below as the plurality of data centers DC). Sharing of data between DCs (SP5) increases the probability that the communication pattern of flows across a plurality of data centers DC can be more accurately estimated. The sharing of data between DCs (SP5) is constituted primarily of three processes (SP5-1 to SP5-3). Below, the content of the processes will be described in detail.

The first process (SP5-1) is a process for notifying the external data center DCj of customer information (entry of customer information table 214) stored in the data center DCi. The first process (SP5-1) is executed every given time interval, for example. The external linking function 204 transmits an entry in the customer information table 214 as a destination of the fault estimation system IP address 1302 of the external DC management information table 1300. The external linking function 204 may transmit the value of all fields every time as customer information, or may transmit only information differing from the previously transmitted customer information (but always including the customer ID 701).

The second process (SP5-2) is a process of responding to an information acquisition request from the external data center DCj and transmitting the corresponding information. The information requested from the external data center DCj includes, for example, two types: flow characteristic information of the customer identified by the customer ID 701, or time series data of the flow identified by flow characteristic information other than for the virtual NW ID 810.

If flow characteristic information for a specific customer is requested, then the external linking function 204 acquires one or more virtual NW IDs 702 associated with the customer ID 701 of the requested customer from the customer information table 214. Next, the external linking function 204 acquires, from the flow characteristic information table 800, flow characteristic information including the acquired virtual NW ID 702 for each virtual NW ID 810 matching the virtual NW ID 702. Then the external linking function 204 transmits the information excluding the flow ID 801 and the virtual NW ID 810 from the acquired flow characteristic information to the external data center DCj that made the request.

Also, if time series data of a specific flow is requested, the external linking function 204 acquires, from the flow characteristic information table 800, a flow ID 801 matching the flow characteristic information of the requested flow. Next, the external linking function 204 refers to the time series data table 900 and acquires an entry (in some cases, a plurality thereof) of a flow ID 901 matching the acquired flow ID 801. Then the external linking function 204 extracts a group of entries, from among the acquired entries, where the acquisition source DC ID 905 is blank (that is, time series data acquired at the same data center DCi), and for which the calculation time 903 is from the current time to a predefined time prior to the current time. Then, the external linking function 204 transmits, to the external data center DCj that made the request, the calculation time 903 and the estimated number of packets 904 of the extracted group of entries.

The information transmitted in the second process (SP5-2) may be information that differs from that previously requested. Also, instead of transmitted information in response to every request, new information may be transmitted periodically to the data center DCj that made a request for information once.

The third process (SP5-3) is a process of acquiring time series data of a flow from the external data center DCj that moves across the data center DCi and the external data center DCj. First, the external linking function 204 stores the customer ID periodically transmitted from the external data center DCj in the stored customer ID field 1502 of the external DC customer information table 1500, in order to ascertain the customer information stored by the external data center DCj.

Here, if the same customer ID as the stored customer ID 1502 is present in the customer ID field 701 of the customer information table 212, then the external linking function 204 transmits to the external data center DCj an acquisition request for the flow characteristic information of the customer ID 701. As a result of the acquisition request for the flow characteristic information, the external linking function 204 receives from the external data center DCj a group of pieces of flow characteristic information of the customer ID 701 in the external data center DCj. After receiving the group of pieces of flow characteristic information, the external linking function 204 searches the flow characteristic information table 800 for flows matching the received flow characteristic information.

If there is a flow that matches the received flow characteristic information, the external linking function 204 determines that the flow is moving between the data center DCi and the external data center DCj. The external linking function 204 uses the flow characteristic information of the flow as a key and transmits the time series data acquisition request of the flow to the external linking function DCj. As a result, the external linking function 204 receives from the external data center DCj the time series data of the customer ID 701 in the external data center DCj.

After receiving the time series data, the external linking function 204 stores the received time series data in a time series data table 900. At this time, the external linking function 204 acquires the flow ID 801 of an entry matching the flow characteristic information of the flow from the flow characteristic information table 800, stores the flow ID 801 in a flow ID field 901, stores an empty value in the communication apparatus ID field 902, and stores in an acquisition source DC field 905 the DC ID of the external data center DCj that transmitted the time series data.

Here, sharing of data between DCs (SP5) is an autonomous distributed process by the management apparatuses 50 of the data centers DCi, but the process is not limited to being an autonomous distributed process, and may be a centralized process. In a centralized process of sharing data between DCs (SP5), the management apparatus 50 gathers the customer information, flow characteristic information, or time series data of all data centers DCi managed by a specific management apparatus 50, for example. The sharing of data is accomplished by the management apparatus 50 of each data center DCi acquiring necessary information from a specific management apparatus 50 where the information is gathered. The time series data acquired by the sharing of data between DCs (SP5) is used for communication pattern estimation (SP6).

Next, when fault information of the external data center DCj is issued as a notification (SP7), the external linking function 204 records the fault in the external DC (SP8). The fault information is a general term referring to fault occurrence information indicating that a fault has occurred or fault recovery information indicating recovery from the fault. If the fault information is fault occurrence information, the fault occurrence time is included and if the fault information is fault recovery information, then the fault recovery time is included.

The recording of the fault in the external DC (SP8) is a process for recording the fault information of the external data center DCj in the external DC fault table 1400. Specifically, if recording of the fault in the external DC (SP8) has started, for example, the external linking function 204 searches the external DC management information table 1300 with the source IP address of the fault information as the key, identifies a fault estimation system IP address 1302 that matches the source IP address of the fault information, and extracts the DC ID 1301 corresponding to the fault estimation system IP address 1302. The external linking function 204 stores the extracted the DC ID 1301 in the DC ID field 1401 of the external DC fault table 1400.

Also, the external linking function 204 stores the fault occurrence time or the fault recovery time included in the fault information in the fault occurrence time 1402 or fault recovery time 1403 in the external DC fault table 1400. The information in the external DC fault table 1400 is used when the communication pattern analysis function 202 performs communication pattern estimation (SP11) in order to determine the probability that the communication pattern of the flow between the data center DCi and the external data center DCj has changed as a result of the fault in the external data center DCj (SP9).

Figure 21:
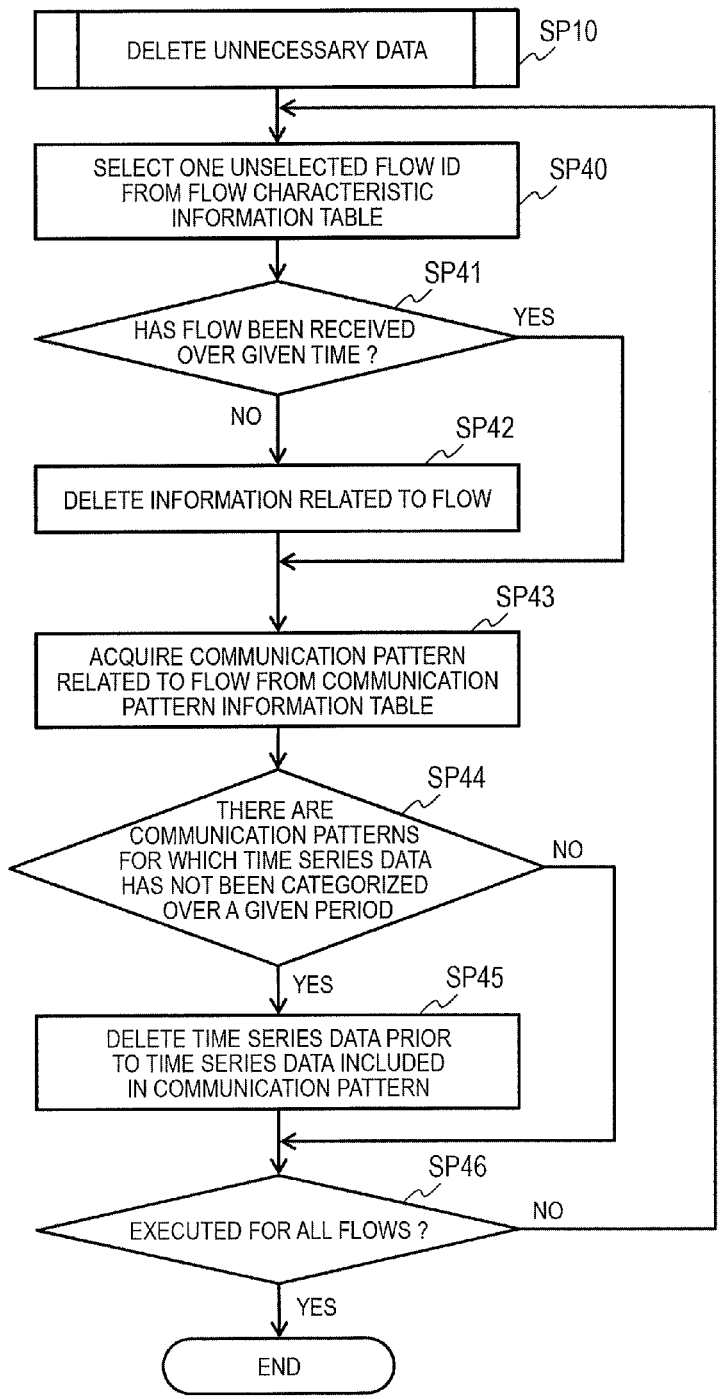
FIG. 21 is a flowchart showing an example of detailed process steps of unnecessary data deletion (SP10) in the unnecessary data deletion function.

The unnecessary data deletion function 205 deletes unnecessary data at a set interval (such as every 24 hours, for example) (SP10). The unnecessary data deletion process (SP10) is a process for deleting data that satisfies given conditions from the flow characteristic information table 800, the time series data table 900, and the external DC customer information table 1500. The unnecessary data deletion process (SP10) can reduce the volume of data stored in the management apparatus 50 as well as mitigate false estimation of the effect certainty resulting from reference to faulty data. As a result, the accuracy of effect certainty estimation is improved. Details of the unnecessary data deletion process (SP10) are shown in FIG. 21.

Figure 22:
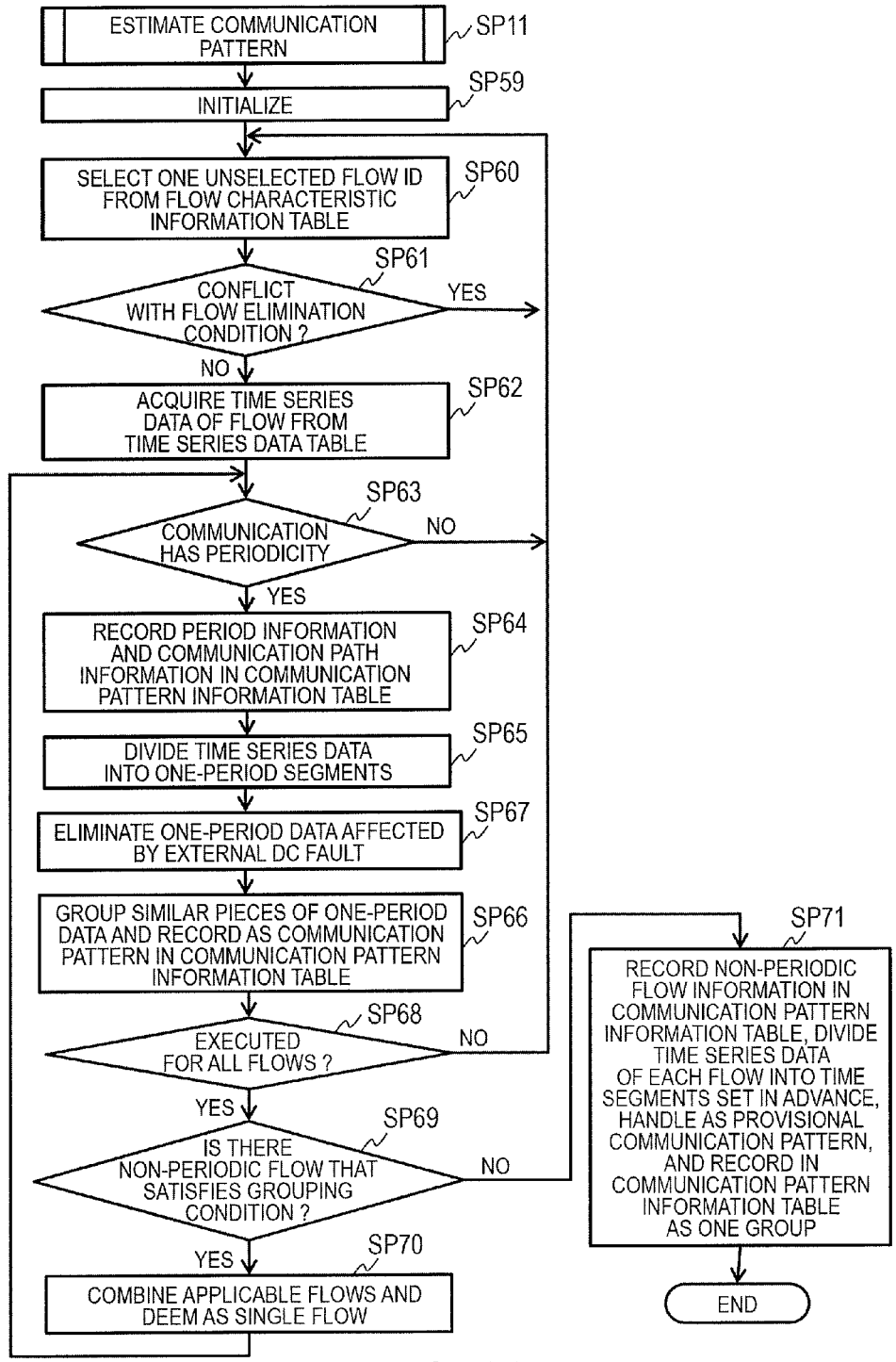
FIG. 22 is a flowchart showing an example of detailed process steps of communication pattern estimation (SP11) in the communication pattern analysis function.

The communication pattern analysis function 202 executes communication pattern estimation at a given time interval (every hour, etc.), for example (SP11). The communication pattern estimation (SP11) is a process that uses the time series data table 900 and the external DC fault table 1400 to estimate the communication pattern of the flow in the data network 10 on the basis of the periodicity. The communication pattern estimation (SP11) enables generation of the communication pattern of each flow and estimation of the certainty that each flow was being transmitted when the fault occurred. Details of the communication pattern estimation (SP11) are shown in FIG. 22. This calculated communication pattern is used in the fault effect certainty estimation process (SP12).

The fault detection function 206 always monitors for faults (SP13). However, fault monitoring (SP13) may be performed using an external fault monitoring apparatus. The fault monitoring (SP13) detects the occurrence of or recovery from faults in the data center DCi and the inter-data center network 2. In one example, the fault subject to fault monitoring (SP13) in the present embodiment is monitored to simply determine whether or not the communication apparatus 20 is running, but besides this, an external fault monitoring apparatus may be used in order to monitor whether or not each interface of the communication apparatus 20 is running or monitor the rate of increase in error packets for each virtual network.

The fault monitoring (SP13) is performed by confirming transmissions from the communication apparatus 20 to the management IP address at a given interval (every 10 seconds, etc.), for example. The management IP address used here is the management IP address 602 of the communication apparatus management table 211 or the external IP address 1303 of the external DC management information table 1300. The fault detection function 206 transmits ICMP (Internet Control Message Protocol) echo request packets to such IP addresses, and if no echo reply packets are transmitted for greater than or equal to a certain period of time, it is determined that a fault has occurred, for example.

Conversely, if transmission from the communication apparatus 20 to the management IP address resumes after a fault has occurred, then the fault detection function 206 determines that the communication apparatus 20 has recovered from the fault. If monitoring of the external communication apparatus of the external data center DCj to determine if the external communication apparatus is running fails, the fault detection function 206 determines that a fault has occurred in the inter-data center network 2, and if conversely communication resumes after the fault has occurred, then it is determined that the inter-data center network 2 has recovered from the fault.

If the occurrence of or recovery from the fault is detected as a result of the fault monitoring (SP13), the fault detection function 206 issues the fault information to the effect certainty estimation function 203 and the external linking function 204 (SP14). As described above, the fault information includes two types: fault occurrence information and fault recovery information. The fault occurrence information includes the fault occurrence time and the communication apparatus ID of the communication apparatus where the fault has occurred. If a fault has occurred in the inter-data center network 2, then the information additionally includes a list of flows that have possibly been impacted by the fault. Meanwhile, the fault recovery information includes the fault recovery time and the communication apparatus ID of the communication apparatus that recovered from the fault.

When notification of the fault information is received (SP14), then the external linking function 204 performs fault information notification. The fault information notification (SP15) is a process to notify the external data center DCj of the fault information. The fault information with which the external data center DCj is notified is used in order to detect outliers in the communication pattern on the basis of the information of the external data center DCj as previously mentioned. Specifically, for example, during fault information notification (SP15), when the external linking function 204 receives the notification of the fault occurrence information (SP14), it stores the fault occurrence time and communication apparatus ID where the fault has occurred, which are included in the fault occurrence information, and when notification of the fault recovery information is received, then from among the stored fault occurrence times the fault occurrence information with the latest fault occurrence time and with the same communication apparatus ID as the fault recovery information in the notification is called. The external linking function 204 transmits the external DC fault information storing the fault occurrence time and the fault recovery time to all linked external data centers DCj.

Lastly, when the effect certainty estimation function 203 receives the notification of the fault occurrence information (SP14), it executes effect certainty estimation (SP16). The effect certainty estimation (SP16) estimates the certainty that each flow passed through a communication apparatus where a fault has occurred and at the time that the fault occurred on the basis of the communication pattern information, thereby calculating the certainty that a customer has been affected by the fault. Details of the effect certainty estimation (SP16) are mentioned later with reference to FIG. 23. When the effect certainty estimation process ends, the effect certainty estimation function 203 transmits the effect certainty information 32 to the notification destination 40 (SP17).

<Flowchart of Process in Customer Fault Effect Estimation Sequence>

[Time Series Data Calculation (SP3)]

Figure 19:
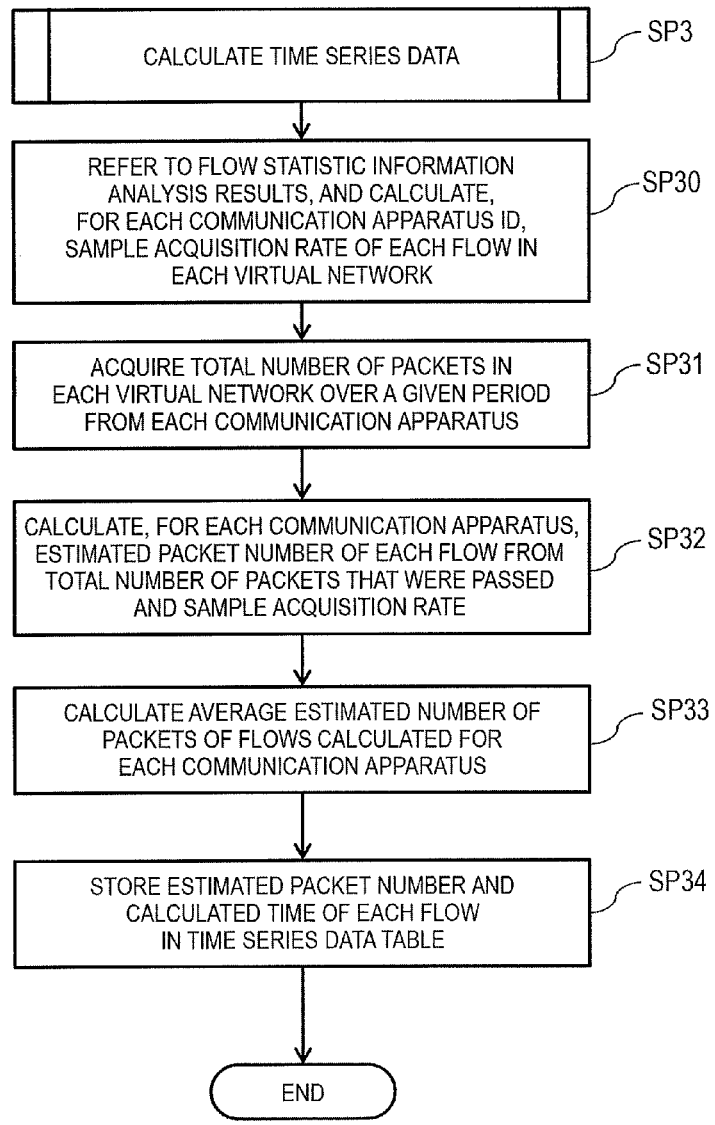
FIG. 19 is a flowchart showing an example of detailed process steps of time series data calculation (SP3) in the flow information analysis function shown in FIG. 18.

FIG. 19 is a flowchart showing an example of detailed process steps of time series data calculation (SP3) in the flow information analysis function 201 shown in FIG. 18. The time series data calculation (SP3) is executed at a given interval (hereinafter referred to as chronological calculation interval). The time series data calculation (SP3) is a process of calculating the estimated number of packets of each flow that have passed during the time period of the chronological calculation interval, according to the flow information stored in the flow statistic information analysis result table 1700.

The time series data calculation (SP3) does not simply count the number of sample packets 1600 but combines the total number of packets that have passed through each virtual network as counted by the virtual NW statistic calculation function 23 of the communication apparatus 20 with the information of the sample packets 1600, thereby improving the accuracy of estimating the number of packets. The time series data calculation (SP3) improves the estimation accuracy for the number of packets by outputting the final average of the estimated numbers of packets calculated for the plurality of communication apparatuses 20.

When the time series data calculation (SP3) starts, the flow information analysis function 201 first calculates the acquisition rate of sample packets 1600 for each flow in each virtual network for each communication apparatus ID (SP30). Specifically, for example, the flow information analysis function 201 categorizes all entries of the flow statistic information analysis result table 1700, that is, the sample packets 1600, which were sampled in the data network 10 during the time period of the time series data calculation interval, for each communication apparatus ID 1702. Also, the flow information analysis function 201 refers to the flow characteristic information table 800, searches entries of the flow ID 801 that match the flow ID 1701, and identifies the virtual NW ID 810 of the entry. The flow information analysis function 201 counts the number of entries (hereinafter referred to as "virtual NW sample number for each communication apparatus") per identified virtual NW ID 810.

Also, the flow information analysis function 201 refers to the flow statistic information analysis result table 1700 and counts the number of entries (hereinafter referred to as "flow sample number for each virtual network for each communication apparatus") per flow ID 1701 in the same virtual network. Then, the flow information analysis function 201 calculates a value attained by dividing the flow sample number for each virtual network for each communication apparatus by the virtual NW sample number for each communication apparatus (hereinafter referred to as the "ratio of flow samples for each virtual NW for each communication apparatus"). The above content will be described using a simple example.

Figure 20:
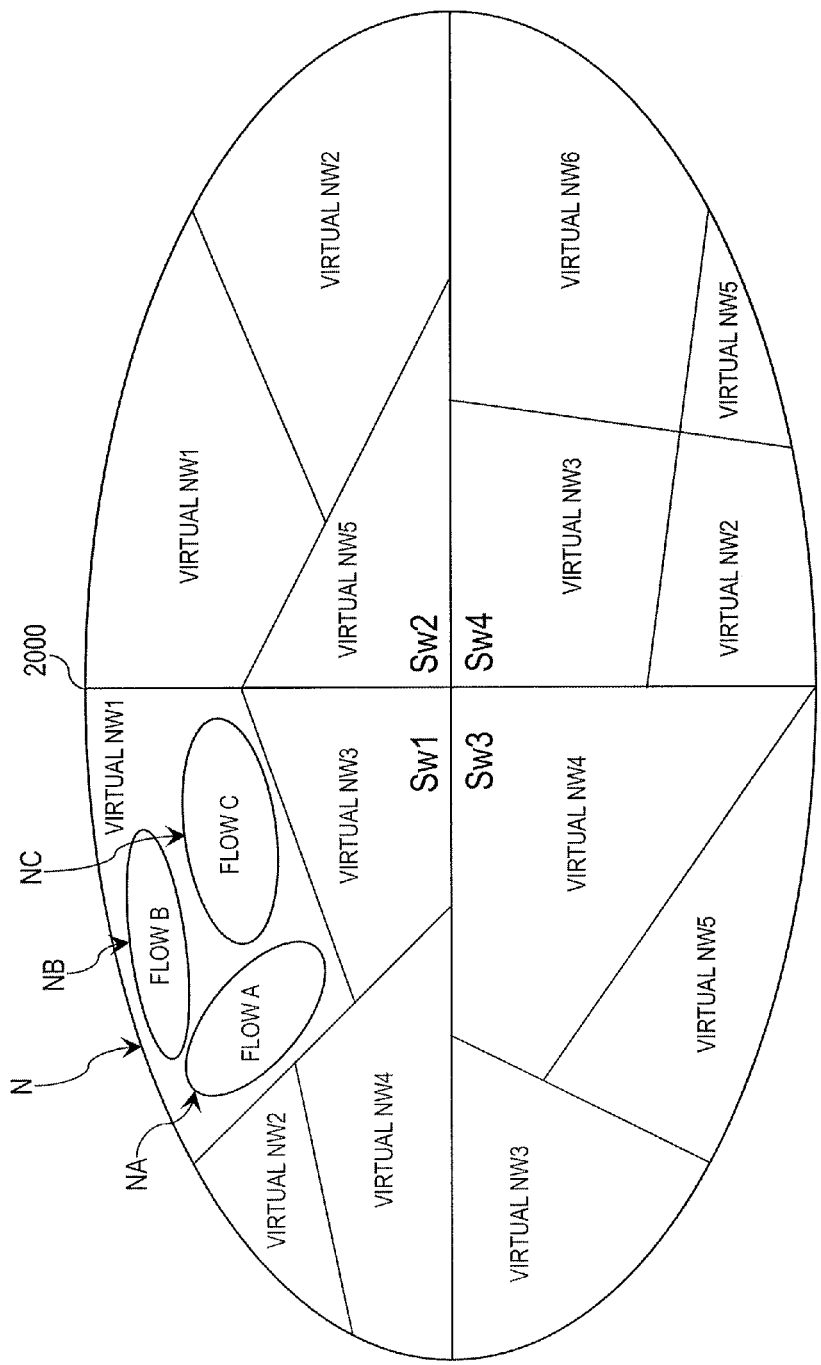
FIG. 20 is a conceptual view showing an example of an acquisition proportion (SP30) of the sample packets.

FIG. 20 is a conceptual view showing an example of an acquisition proportion (SP30) of the sample packets 1600. The ellipse 2000 represents all entries in the flow statistic information analysis result table 1700 during the time period of the time series data calculation interval. All entries 2000 are categorized for each communication apparatus ID 1702, and in FIG. 20, all of the entries 2000 are categorized into four entry groups: Sw1 (top left wedge), Sw2 (top right wedge), Sw3 (bottom left wedge), and Sw4 (bottom right wedge) as communication apparatus IDs 1702. The entry groups for each communication apparatus ID (Sw1 to Sw4) indicated with wedges are further categorized for each virtual NW ID 810 corresponding to the flow ID 801 matching the flow ID 1701.

When focusing on the Sw1 (top left wedge) entry groups, the flows identified by the Sw1 (top left wedge) entry groups are transmitted by the virtual NWs 1 to 4, and thus, are classified in the entry groups of the virtual NWs 1 to 4. When focusing on the entry group of the virtual NW 1, the flows identified in the entry group of the virtual NW 1 include flows A, B, and C. The number of entries N in the entry group of the virtual NW 1 is the virtual NW sample number for each communication apparatus where the communication apparatus ID 1702 is "Sw1" and the virtual NW ID 810 is "virtual NW 1". Also, the number of entries NA in the entry group of the flow A is the flow sample number of the flow A for each virtual NW for each communication apparatus where the communication apparatus ID 1702 is "Sw1" and the virtual NW ID 810 is "virtual NW 1". Similarly, the number of entries NB in the entry group of the flow B is the flow sample number of the flow B for each virtual NW for each communication apparatus where the communication apparatus ID 1702 is "Sw1" and the virtual NW ID 810 is "virtual NW 1". Similarly, the number of entries NC in the entry group of the flow C is the flow sample number of the flow C for each virtual NW for each communication apparatus where the communication apparatus ID 1702 is "Sw1" and the virtual NW ID 810 is "virtual NW 1".

In the above example, the virtual NW sample number N for each communication apparatus is the total number of flow sample numbers NA to NC for each virtual NW for each communication apparatus of the flows A to C. The ratios of flow samples PA to PC for each virtual NW for each communication apparatus of each flow A to C are as follows.

$$PA=NA/N$$

$$PB=NB/N$$

$$PC=NC/N$$

Returning to FIG. 19, the flow information analysis function 201 accesses each communication apparatus 20 in the data network 10, and acquires the total number of packets in the virtual network that have passed through during the time period of the time series data calculation interval calculated by the virtual NW statistic calculation function 23 of the communication apparatuses 20 (hereinafter referred to as the "total number of packets in the virtual NW") (SP31). A publicly known technique such as Telnet or SSH (Secure Shell) can be used as the protocol for accessing each communication apparatus 20. If only the total number of virtual NW packets from the start time of the communication apparatus 20 can be acquired from the virtual NW statistic calculation function 23, the flow information analysis function 201 calculates the "total number of virtual NW packets" by subtracting from the currently acquired "total number of virtual NW packets" the "total number of virtual NW packets" acquired when the time series data calculation (SP30) was performed during the previous process cycle.

Next, the flow information analysis function 201 calculates the estimated number of packets for each flow by multiplying the flow sample ratios PA to PC for each virtual NW for each communication apparatus of each flow, by the total number of packets in the virtual NW where the communication apparatus 20 and the virtual network correspond to the flow sample ratios PA to PC for each virtual NW for each communication apparatus (SP32).

Specifically, for example, in FIG. 20, the total number of virtual NW packets where the communication apparatus ID 1702 is "Sw1" and the virtual NW ID 810 is "virtual NW 1" is NZ. The estimated numbers of packets NeA to NeC for the respective flows A to C are as follows.

$$NeA=NZ \times PA$$

$$NeB=NZ \times PB$$

$$NeC=NZ \times PC$$

Next, the flow information analysis function 201 calculates the average among the communication apparatuses 20 of the estimated number of packets NeA to NeC of each flow calculated for each communication apparatus 20 in step SP32 (hereinafter referred to as "average estimated number of packets") (SP33). For the flow A, it is assumed that Sw1 and Sw2 are present in the communication apparatus ID field 902 of the time series data table 900, for example. In the example above, for the communication apparatus ID 1702: "Sw1", the estimated number of packets NeA was calculated, and similarly, the estimated number of packets is calculated for Sw2. The flow information analysis function 201 calculates the average of both estimated numbers of packets to attain the average estimated number of packets.

In order to prevent error in the average resulting from communication apparatuses 20 outside of the flow communication path, communication apparatuses 20 for which the estimated number of packets of the flow were not calculated (that is, communication apparatuses through which the flow did not pass, or that were not included in the sampling) are excluded from the averaging performed for the flow. In the case of communication apparatuses 20 with redundancy, the flow information analysis function 201 totals the estimated numbers of packets of communication apparatuses 20 having the same redundancy group ID 603, and then calculates the average estimated number of packets with other communication apparatuses 20. This is because in the case of redundancy in which a plurality of communication apparatuses 20 are used simultaneously, one flow is distributed among a plurality of communication apparatuses 20.

Lastly, the flow information analysis function 201 stores the calculation results in the time series data table 900 (SP34). Specifically, for example, the flow information analysis function 201 stores the flow ID of the corresponding flow in the flow ID field 901. The flow information analysis function 201 stores, in the communication apparatus ID field 902, the communication apparatus ID of the communication apparatus 20 to be the acquisition source of the sample packets 1600 during the time period of the time series data calculation interval. The flow information analysis function] 201 stores the time at which the time series data calculation (SP3) was executed in the calculation time field 903. The flow information analysis function 201 stores the average estimated number of packets calculated in SP33 in the estimated packet number field 904. The flow information analysis function 201 stores an empty value in the acquisition source DC ID field 905 (indicated with "-" in FIG. 9). As a result, the flow information analysis function 201 ends the flow time series data calculation (SP3).

Thus, the time series data calculation (SP3) does not simply count the number of sample packets 1600 but combines the total number of packets that have passed through each virtual network as counted by the virtual NW statistic calculation function 23 of the communication apparatus 20 with the information of the sample packets 1600, thereby enabling improvement in accuracy in estimating the number of packets.

In the time series data calculation (SP3) it is possible to improve the estimation accuracy for the number of packets by outputting the final average of the estimated numbers of packets calculated for the plurality of communication apparatuses 20.

[Unnecessary Data Deletion (SP10)]

FIG. 21 is a flowchart showing an example of detailed process steps of unnecessary data deletion (SP10) in the unnecessary data deletion function 205. The unnecessary data deletion (SP10) is executed at a determined interval, for example, and is a process of deleting, from the flow characteristic information table 800 and the communication pattern information table 213, data that has a high probability of not being currently used. The unnecessary data deletion (SP10) reduces the amount of data stored in the management apparatus 50 and improves the accuracy when estimating the effect certainty.

When the unnecessary data deletion (SP10) starts, the unnecessary data deletion function 205 first selects one unselected flow ID 801 from the flow characteristic information table 800 (SP40).

Next, the unnecessary data deletion function 205 acquires, from the time series data table 900, the calculation time 903 of the entry acquired last among entries with the same flow ID 901 as the selected flow ID 801 in SP40. Then, the unnecessary data deletion function 205 determines whether the flow indicated by the flow ID 901 of the last acquired entry has received new sample packets 1600 over a given time period up to the current time (SP41). Specifically, for example, the unnecessary data deletion function 205 determines whether the difference between the acquired calculation time 903 and the current time is greater than a value set by a manager or the like of the data center DCi (hereinafter referred to as "flow existence period"). If the difference is greater, this signifies that the flow indicated by the flow ID 901 has not received new sample packets 1600 over a given period. Thus, the answer to S41 is "No", and the process progresses to SP43.

On the other hand, if the difference is not greater, this signifies that the flow indicated by the flow ID 901 has received new sample packets 1600 over a given period. Thus, the answer to 841 is "Yes", and the process progresses to SP42.

In SP42, the unnecessary data deletion function 205 deletes information relating to the flow indicated by the flow ID 901 (SP42) and the process progresses to SP43. The related information that is deleted is an entry with a flow ID matching the flow ID 901 in the flow characteristic information table 800, the time series data table 900, and the external DC customer information table 1500.

In SP43, the unnecessary data deletion function 205 acquires from the communication pattern information table 213 an entry having the same flow ID 1001 as the aforementioned flow ID (SP43).

Then, the unnecessary data deletion function 205 refers to the pattern ID 1005 identifying the communication pattern and the data interval 1006 corresponding thereto in the entry acquired in SP43, and determines whether there is a communication pattern where new time series data has not been classified over a given period up to the current time (step S44). Specifically, for example, the unnecessary data deletion function 205 determines whether, in each communication pattern, the difference between the time at which data was last classified and the current time is greater than a value set by a manager or the like of the data center DCi (hereinafter referred to as "communication pattern existence period"). If the difference is greater, this indicates that in the communication pattern, new time series data has not been classified over a given period up to the current time, and if the difference is greater, then new time series data has been classified over a given period up to the current time.

If there is not a single communication pattern in which new time series data has not been classified over a given period up to the current time (SP44: No), then this indicates that new time series data has been classified over a given period for all communication patterns, and the process progresses to SP46. On the other hand, if there are communication patterns where the new time series data has not been classified over a given period up to the current time (SP44: Yes), then there is a possibility that the communication pattern may not appear at the current time due to configuration changes in the data center DCi or the customer system. The presence of such a communication pattern can cause false estimation of the effect of a fault.

On the other hand, if time series data included in the communication pattern were simply deleted, then time series data of a given period is lost during estimation of the communication pattern (that is, the traffic is recognized as 0), which increases the probability of false detection of the period. In order to prevent this, the unnecessary data deletion function 205 deletes, from the time series data table 900, all time series data of flows indicated by flow IDs prior to the last classified time series data in the communication pattern (SP45).

Then, the unnecessary data deletion function 205 determines whether the process of steps SP41 to SP45 has been executed for all flows in the flow characteristic information table 800 (SP46). If the process has not been executed for all flows (SP46: No), then the process returns to SP40. On the other hand, if the process has been executed for all flows (SP46: Yes), the unnecessary data deletion function 205 ends the unnecessary data deletion (SP10). As a result, the amount of data stored in the management apparatus 50 is reduced, and the accuracy of estimation of effect certainty is improved.

[Communication Pattern Estimation (SP11)]

FIG. 22 is a flowchart showing an example of detailed process steps of communication pattern estimation (SP11) in the communication pattern analysis function 202. The communication pattern analysis function 202 is executed at a given interval (hereinafter referred to as the "communication pattern estimation interval"), for example. The communication pattern analysis function 202 estimates the communication pattern of each flow on the basis of the periodicity of each flow from the time series data of the flow stored in the time series data table 900.

During communication pattern estimation (SP11), the communication pattern analysis function 202 calculates a plurality of communication patterns from one flow in order to distinguish outliers in communication patterns of each flow that result from maintenance of the customer system or the like. Also, the communication pattern analysis function 202 determines the probability that an abnormal communication pattern has been generated as a result of a fault in the external data center DCj, and performs a process of determining that the communication pattern is an outlier.

Also, the communication pattern analysis function 202 deletes as outliers flows such as broadcasts that have been transmitted or received regardless of whether the customer has used these flows for communication, on the basis of packet information. Also, in the case of a flow that has no periodicity on its own but where periodicity is found when combining a plurality of flows, the communication pattern analysis function 202 calculates the communication pattern by combining the plurality of flows. Furthermore, the communication pattern analysis function 202 calculates the communication pattern according to a provisional period even for flows where no periodicity is found. As a result, it is possible to estimate effect certainty for a fault even for customers having flows with no periodicity.

When the communication pattern estimation (SP11) is started, the communication pattern analysis function 202 first deletes all entries including prior communication pattern information in the communication pattern information table 213, thereby initializing the communication pattern information table 213 (SP59). This is in order to prevent the storage of a miscalculated period resulting from an inadequate amount of time series data. Thus, a configuration may be adopted in which information identifying flows for which a stable period is calculated, where the period does not change even with an increase in time series data, is added to the communication pattern information, with entries including the communication pattern information of flows with stable periods not being deleted.

Next, the communication pattern analysis function 202 selects one unselected flow ID 801 from the flow characteristic information table 800 (SP61). Then, the communication pattern analysis function 202 acquires the flow characteristic information that is the entry of the selected flow ID from the flow characteristic information table 800, and determines whether the flow characteristic information satisfies the flow elimination condition 1100 (SP62). If the condition is satisfied (SP61: Yes), then the selected flow is seen to be a flow that is transmitted or received regardless of whether the selected flow was used for communication by the customer. Thus, the communication pattern analysis function 202 stops the communication pattern estimation (SP11) of the selected flow ID and restarts the process from SP60. On the other hand, if the condition is not satisfied (SP61: No), the communication pattern analysis function 202 acquires the time series data of all entries with the same flow ID 901 as the selected flow ID from the time series data table 900 (SP62).

Then, the communication pattern analysis function 202 determines whether the selected flow has periodicity (SP63). Fourier analysis or wavelet analysis is used in determining the presence or absence of periodicity, for example. Specifically, in the case of Fourier analysis, for example, Fourier transform is performed on the calculation time 903 and the estimated number of packets 904 of the time series data acquired in SP62, and a distribution function of frequencies of the acquired time series data is calculated. This distribution function is a function in which frequencies (frequency numbers) included in the acquired time series data are expressed as a spectral intensity.

In the distribution function, besides cases where the frequency is 1 (a frequency of 1 indicates the lack of a period), frequencies with the highest spectral intensity and where the difference between the spectrum and other frequencies (for example, difference between the spectrum and the standard deviation in the distribution function of the frequencies) is at a given value or greater are seen as frequencies of the acquired time series data. The communication pattern analysis function 202 calculates the period by performing the calculation of "acquisition period of acquired time series data÷frequency of acquired time series data". The acquisition period of the acquired time series data is the period where the earliest calculation time 903 is subtracted from the latest calculation time 903 among the group of entries indicating the time series data of the selected flow.

The communication pattern analysis function 202 determines the presence or absence of periodicity in communication by whether or not calculation of the period is possible. If the period cannot be calculated, the selected flow is considered not to have a period (SP63: No), and the communication pattern analysis function 202 stops the communication pattern estimation (SP11) of the selected flow and restarts the process from SP60.

On the other hand, if the period can be calculated, then the communication is seen to have periodicity (SP63: Yes), and the communication pattern analysis function 202 associates, with the selected flow ID 901, information indicating the calculation period and the presence of periodicity in SP63 that is the period information (period 1004 and periodicity 1003) and the communication apparatus ID of the communication apparatus in the acquired time series data to be the communication path 1002, and stores the associated information in the communication pattern information table 213. Regarding the communication path 1002, a configuration may be adopted in which only communication apparatus IDs from a given period of time that is most recent among the acquired time series data is referred to, with consideration for cases in which the path has changed due to movement of the virtual machine.

Next, the communication pattern analysis function 202 divides the acquired time series data into calculation periods, and creates a plurality of pieces of time series data of one period each (referred to as "one-period data") (SP65). The communication pattern analysis function 202 eliminates the one-period data affected by external DC faults (SP66). Specifically, for example, among the plurality of pieces of one-period data, the communication pattern analysis function 202 deletes as outliers one-period data included from the fault occurrence time 1402 to the fault recovery time 1403 in the external DC fault table 1400 for flows in which the selected flow ID is included in the flow ID 1503 of the external DC customer information table 1500. However, the one-period data is not deleted from the time series data table 900.

Then, the communication pattern analysis function 202 groups similar pieces of one-period data into a data interval 1006, applies a unique pattern ID 1005 to each group, and records the pattern ID 1005 and the data interval 1006 in the communication pattern information table 213 as the communication pattern information (SP67).

Here, the similarity between pieces of one-period data will be explained. If a correlation coefficient calculated by correlation analysis is greater than or equal to a certain value for a plurality of pieces of one-period data, for example, then the plurality of pieces of one-period data are seen as similar and thus grouped. Also, if a DTW (dynamic time warping) calculated by the dynamic time warping method is less than or equal to a given value for a plurality of pieces of one-period data, for example, then the plurality of pieces of one-period data are seen as similar and thus grouped. In the data interval field 2006 at the time of recording of the communication pattern information table 213, a collection of time information of the grouped time series data is stored as the communication pattern. In the entry of FIG. 10 where the flow ID 1001 is "Flow1", there are two pattern IDs 1005 ("Pattern1" and "Pattern2"), which indicates that the entry is divided into two groups.

Then, the communication pattern analysis function 202 determines whether the steps SP59 to SP67 have been executed for all flows in the flow characteristic information table 800 (SP68). If the steps have not been executed for all flows (SP68: No), then the process returns to SP60.

On the other hand, if the steps have been executed for all flows (SP68: Yes), then the communication pattern analysis function 202 determines whether there is a combination of non-periodic flows, in the flow characteristic information table 800, that satisfies the flow combination conditions 1200 of FIG. 12 among the flows determined not to have periodicity in step SP63 (referred to as "non-periodic flows") (SP69). Specifically, the communication pattern analysis function 202 determines whether there are a number of non-periodic flows satisfying the parameter conditions 1201 greater than or equal to the value of the number of same flows 1202.

If there is a combination of non-periodic flows (SP69: Yes), the communication pattern analysis function 202 treats the combination of non-periodic flows satisfying the flow combination conditions 1200 as one flow (SP70) and returns to SP63. On the other hand, if there are no combinations of non-periodic flows (step 369: No), then the process returns to SP71.

Lastly, the communication pattern analysis function 202 records the non-periodic flow in the communication pattern information table 213 (SP71). At this time, the communication pattern analysis function 202 divides the time series data of the non-periodic flow into preset intervals, and the plurality of pieces of divided time series data are recorded as one communication pattern in the communication pattern information table 213. As a result, the management apparatus 50 can record the communication pattern for each flow in advance.

[Effect Certainty Estimation (SP16)]

Figure 23:
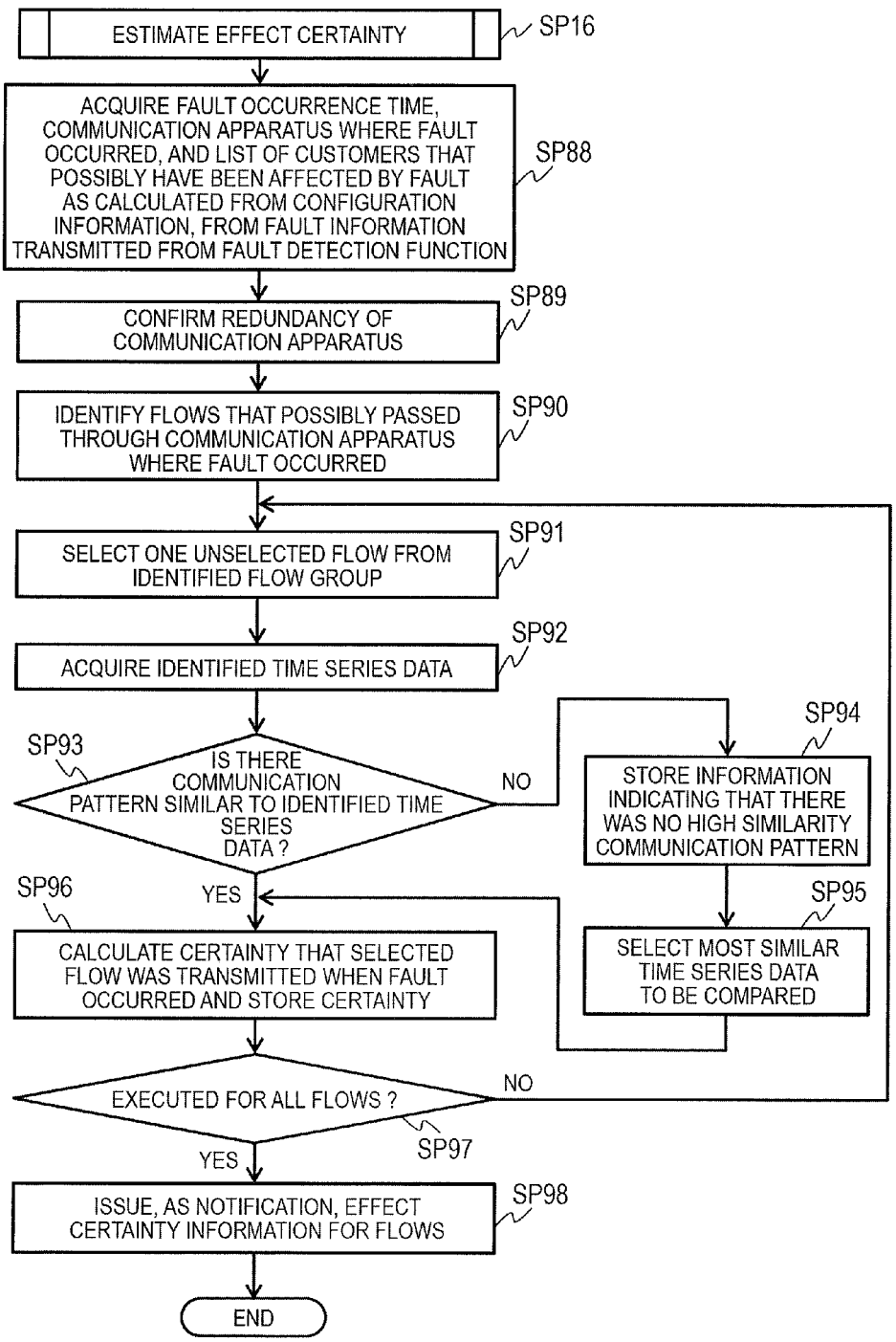
FIG. 23 is a flowchart showing an example of detailed process steps of effect certainty estimation (SP16) in the effect certainty estimation function.

FIG. 23 is a flowchart showing an example of detailed process steps of effect certainty estimation (SP16) in the effect certainty estimation function 203. The effect certainty estimation (SP16) is executed at the fault occurrence time. The effect certainty estimation (SP16) is a process that calculates the effect of a fault on a flow by estimating whether each flow has been transmitted at the fault occurrence time on the basis of the communication pattern information table 213.

When the effect certainty estimation (SP16) is started, the effect certainty estimation function 203 first acquires the fault occurrence time and the communication apparatus ID of the communication apparatus 20 where the fault has occurred from the fault information transmitted from the fault detection function 206 in SP14 (SP88).

Next, the effect certainty estimation function 203 refers to the redundancy group ID 603 of the communication apparatus management table 211, confirms whether the communication apparatus where the fault has occurred has redundancy, and stores the information (SP89). This is done so that if the communication apparatus where the fault occurred has redundancy and there is a possibility that the fault is merely an instantaneous interruption, then a manager of the data center DCi would be notified of this information along with the fault effect certainty information. A configuration may be adopted in which the effect certainty estimation function 203 confirms if the fault has also occurred in the redundant communication apparatus 20, and add such information if a fault has occurred therein.

Next, the effect certainty estimation function 203 identifies a flow that has a probability of having passed through the communication apparatus 20 where the fault has occurred (SP90). Specifically, the effect certainty estimation function 203 acquires, from the communication pattern information table 213, all entries where the communication apparatus ID of the communication apparatus 20 where the fault has occurred is included in the communication path field 1002 (SP90), and selects one unselected entry from among the acquired group of entries, for example (SP91). If the communication apparatus ID of the communication apparatus 20 where the fault has occurred is "Sw1", for example, an entry where the flow ID 1001 is "Flow1" as an entry including "Sw1" in the communication path 1002 is selected from the communication pattern information table 213 as the selected entry.

Next, the effect certainty estimation function 203 acquires, from the time series data table 900, the time series data (referred to as "given time series data") of the flow ID 901 matching the flow ID 1001 of the selected entry from a time that is an amount of time set in advance prior to the fault occurrence time acquired in S88 to the fault occurrence time (referred to as "given interval") (SP92). If the selected entry in SP91 is an entry with "Flow1", for example, then an entry where the flow ID 901 is "Flow1" and where the calculation time 903 is included in the given interval is acquired from the time series data table 900. If the given interval is "2015-06-10 T10:03-2015-06-10 T10:33", for example, then the first row is not acquired but the third entry is acquired.

Next, the effect certainty estimation function 203 calculates the degree of similarity between the given time series data of SP92 and the time series data corresponding to each communication pattern in the same flow as the flow of the selected entry (below, the comparison time series data), and determines whether there is a communication pattern similar to the given time series data (SP93). Specifically, the effect certainty estimation function 203 identifies the time position corresponding to the fault occurrence time in the data interval 1006 of the comparison time series data by calculating the offset to be described later with reference to FIG. 24. Then, the effect certainty estimation function 203 calculates the degree of similarity between the given time series data and the comparison time series data in a range at a given interval starting from the corresponding time position.

The effect certainty estimation function 203 determines that the communication pattern defined by the comparison time series data is similar to the given time series data if the correlation coefficient calculated by correlation analysis between the given time series data and the comparison time series data is greater than or equal to a certain value, or if the DTW distance calculated by the dynamic time warping method is less than or equal to a certain value, for example.

If there is no communication pattern similar to the given time series data (SP93: No), then the effect certainty estimation function 203 determines that there is a high probability that the given time series data differs from the communication pattern up to now, and stores this fact (SP94), selects the most similar comparison time series data among the comparison time series data (SP95), adds the information of SP94 to the selected comparison time series data, and progresses to SP96. The most similar comparison time series data is, for example, comparison time series data where the correlation coefficient, if one is used, is at a maximum or is greater than or equal to a prescribed threshold. If there is no comparison time series data greater than or equal to the prescribed threshold, or if there are a plurality of pieces of comparison time series data greater than or equal to the prescribed threshold, then the comparison time series data with the largest correlation coefficient is used. Also, when using the DTW distance, comparison time series data where the DTW distance is at a minimum or is less than or equal to a prescribed threshold is used. If there is no comparison time series data less than or equal to the prescribed threshold, or if there are a plurality of pieces of comparison time series data less than or equal to the prescribed threshold, then the comparison time series data with the smallest DTW distance is used.

On the other hand, if there is a similar communication pattern (SP93: Yes), then the effect certainty estimation function 203 selects the communication pattern with the highest degree of similarity, uses maximum likelihood estimation or Bayesian inference to calculate the certainty that the flow identified in the selected entry of SP91 was transmitted during the fault occurrence time, and records this certainty (SP96).

Specifically, in the case of simple maximum likelihood estimation, for example, the effect certainty estimation function 203 acquires the estimated number of packets 904 at the same phase as the fault occurrence time, that is, corresponding to the calculation time 903 included in each data interval 1006 of the communication pattern with the highest degree of similarity. The number of data intervals 1006 where the estimated number of packets 904 was acquired is designated as A. Also, the effect certainty estimation function 203 counts the number of data intervals 1006 where an estimated number of packets 904 greater than 0 was acquired, among the A number of data intervals 1006. The number of counted data intervals 1006 is designated as B. The effect certainty estimation function 203 performs the calculation B/A as the certainty that the flow identified in the selected entry of SP91 was transmitted during the fault occurrence time.

Then, the effect certainty estimation function 203 determines whether the steps SP91 to SP96 have been executed for all flows acquired in SP90 (SP97). If the steps have not been executed for all flows (SP97: No), then the process returns to SP91.

If the steps have been executed for all flows (SP97: Yes), then the effect certainty estimation function 203 notifies the notification destination of the effect certainty information 32 (SP98). The flow and the customer are associated with the virtual NW ID 810 attained by comparing the flow ID 1001 in the communication pattern information table 213 with the flow ID 801 of the flow characteristic information table 800, and the virtual NW ID 702 of the customer information table 214. Also, the representative period of the communication pattern is time series data where the average estimated numbers of packets at each time of the one-period data in the communication pattern are combined. Additionally, the number of transmitted packets is the estimated number of packets at the same phase as the fault occurrence time in the representative period of the communication pattern, that is, the time period of the extracted time series data with the highest degree of similarity.

Figure 24:
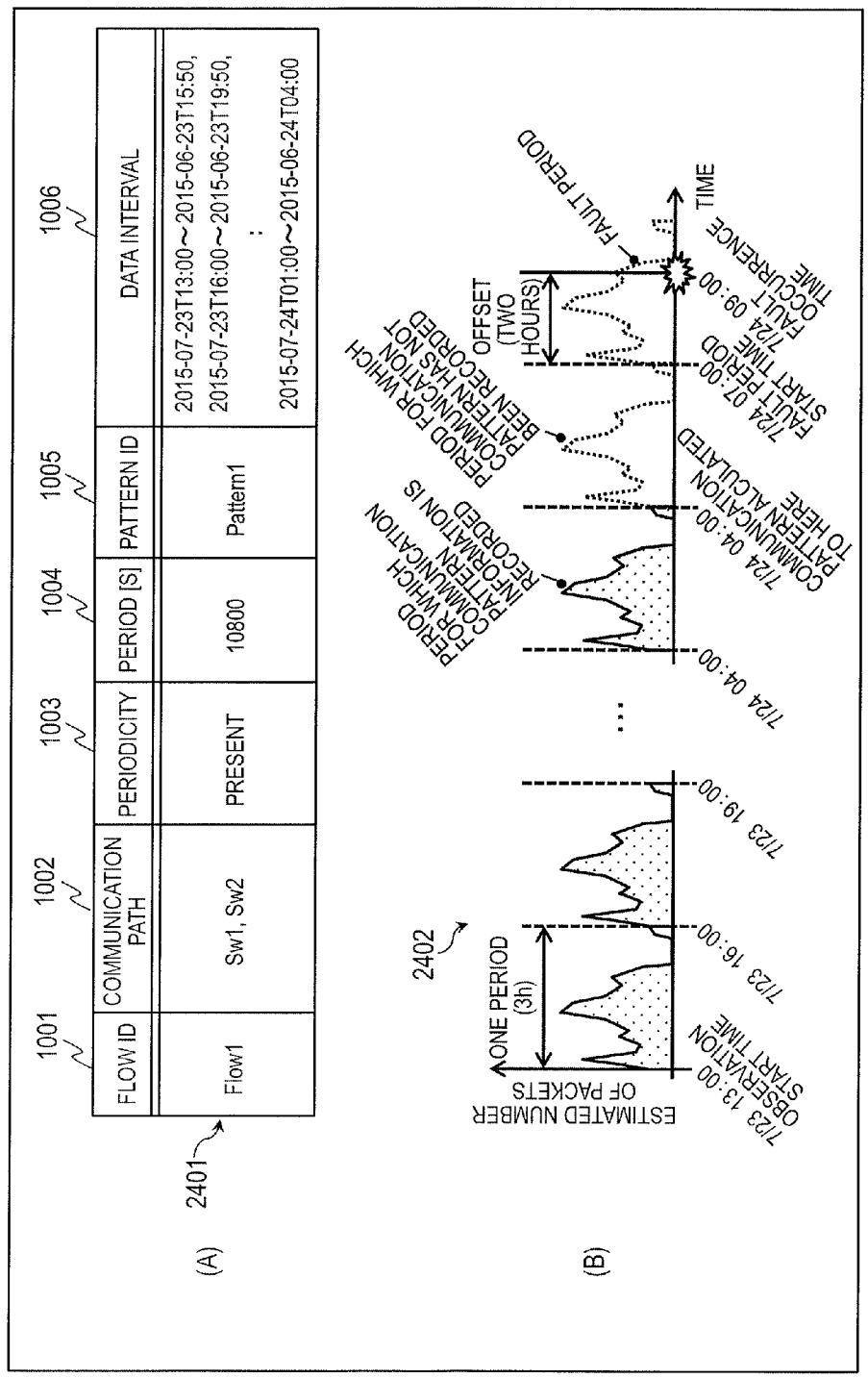
FIG. 24 is a descriptive view showing an example of the relationship between the fault occurrence time and the time position of the period.

FIG. 24 is a descriptive view showing an example of the relationship between the fault occurrence time and the time position of the period. An example is described in which the fault occurrence time is "2015 7/24 9:00" and a fault has occurred in a communication apparatus 20 with a communication apparatus ID of Sw1. The communication pattern information 2401 shown in FIG. 24(A) is an entry in the communication pattern information table 213 showing a flow (flow ID 1001: Flow1; hereinafter referred to simply as "Flow 1") that has a possibility of having passed through a communication apparatus 20 where a fault has occurred, which was identified in SP90. The graph shown in FIG. 24(B) is a communication pattern waveform 2402 of the pattern ID: Pattern1 represented by the time series data of the estimated number of packets in the data interval 1006 of the communication pattern information 2401 of FIG. 24(A).

In FIG. 24(B), the measurement start time is the time at which observation of the flow 1 has started. The period is a duration over which the same waveform is repeated. The period start time is the start time of the period. The fault period is the period including the fault occurrence time from the start time to the end time of the period. The fault period start time is the start time of the fault period. The offset is the time difference between the period start time of the fault period and the fault occurrence time. In the present example, this offset is two hours.

The time attained by shifting the period start time of each period (time on left side of data interval 1006 of communication pattern information 2401) by the offset time is the time position corresponding to the fault occurrence time. By calculating the offset time, it is possible to associate the fault occurrence time with the period time position. The calculation method is as follows.

First, the effect certainty estimation function 203 calculates the fault period start time by the following formula (1).

$$\text{fault period start time} = \text{period} \times n \tag{1}$$

Here, "n" is an integer satisfying the following formula (2).

$$\text{measurement start time} + \text{period} \times n \leq \text{fault occurrence time} < \text{measurement start time} + \text{period} \times (n+1) \tag{2}$$

Next, the effect certainty estimation function 203 calculates the offset by the following formula (3).

$$\text{offset} = \text{fault occurrence time} - \text{fault period start time} \tag{3}$$

The effect certainty estimation function 203 associates with the fault occurrence time the time position shifted forward by the offset amount from the start time of each period, thereby calculating the degree of similarity between the time series data identified in SP91 and the time series data (comparison time series data) corresponding to each period.

<Display Screen Example>

Figure 25:
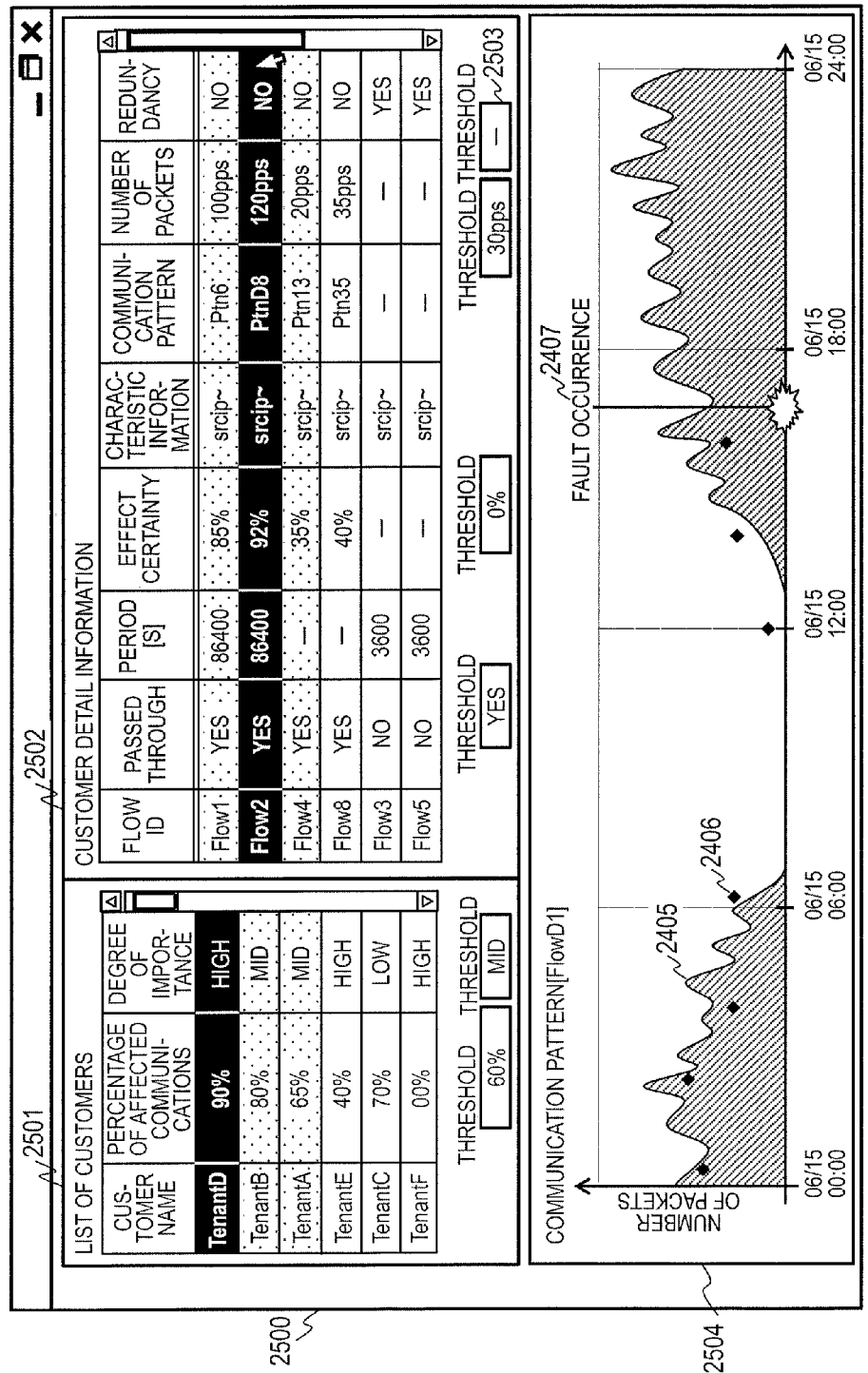
FIG. 25 is a descriptive view of one example of a display screen in a client terminal or an operation management apparatus of the notification destination.

FIG. 25 is a descriptive view of one example of a display screen in a client terminal 42 or an operation management apparatus 41 of the notification destination 40. The display screen 2500 is a screen for presenting, to the manager of the data center DCi or the operation management apparatus 41, information indicating whether a customer has been affected by a fault. The display screen 2500 includes a customer list display region 2501, a customer detail display region 2502, and a communication pattern display region 2504.

The customer list display region 2501 is a region displaying list information of the effect of a fault on each customer. The customer detail display region 2502 is a region displaying in detail information of a given customer selected by an operator (row with black background in FIG. 25) among the customers in the customer list display region 2501. The communication pattern display region 2504 is a region displaying a graph of the communication pattern of a given flow and given time series data selected by an operator (row with black background in FIG. 25) among the flows in the customer detail display region 2502.

In the tables in the customer list display region 2501 and the customer detail display region 2502, the data can be reordered in ascending or descending order in each column, and by the operator inputting a given value as a threshold 2503, it is possible to narrow down the information being displayed. Methods by which the narrowing down is displayed include adding a background color to data satisfying the threshold condition (shaded rows in FIG. 25) or not displaying data that does not satisfy the threshold condition.

The customer list display region 2501 displays the customer name, the percentage of affected communications, and the degree of importance. The percentage of affected communications is the percentage of communications where customers have been affected by a fault. However, the percentage of affected communications field may display other information depending on the setting, and may be a value indicating communications that have been most affected, for example.

The customer detail display region 2502 displays flow information for each flow of a customer selected in the customer list display region 2501. The flow information includes, for example, the flow ID, the presence or absence of communication, the period, the effect certainty, the characteristic information, the communication pattern, the number of packets, and the redundancy.

The "presence or absence of communication" among the flow information is information indicating whether the flow has passed through the communication 20 where the fault has occurred. "Yes" indicates that the flow has passed through and "no" indicates that the flow has not passed through. The "characteristic information" is information indicating the entry of the flow characteristic information table 800 for same flow IDs. The "effect certainty" is the degree of certainty calculated in the effect certainty estimation of FIG. 23 for the flow (SP96). The "communication pattern" is the communication pattern of the flow at the fault occurrence time. The "number of packets" is the estimated number of packets in the communication pattern at the fault occurrence time. The "redundancy" indicates the presence or absence of redundancy for the communication apparatus 20 where the fault has occurred. Also, when the operator selects a given piece of flow information, the communication pattern information of the flow is displayed in the display region 2504.

The communication pattern display region 2504 displays a communication pattern representative period 2505 and sample information 2506 of given time series data, with the vertical axis of the graph indicating the number of packets and the horizontal axis indicating time. By displaying the fault occurrence time 2507 in the graph, it is possible for a manager of the data center DCi to see on a graph the effect that a fault has had on each flow.

In this manner, the management apparatus 50 can estimate the degree of certainty that each customer has been affected by a fault on the basis of each customer's communication use in order to determine affected customers and unaffected customers when a fault has occurred, upon seeing the communication use for customers with low traffic as well, and without needing to always analyze all communications in the data center DCi. Therefore, it is possible for the manager of the data center DCi to quickly narrow down the affected customers for whom rapid response is necessary, and to prioritize the response to such customers.

Also, as a result of grouping communication patterns by degree of similarity, the management apparatus 50 can eliminate as outliers changes in the application of each flow caused by routine maintenance and configuration changes of the customer system. Thus, it is possible to improve the accuracy of estimating the certainty that a customer has been affected by a communication fault.

Also, the management apparatus 50 acquires the total number of packets within a designated period of time per customer from each communication apparatus, and combines this information with information of the sample packets when generating time series data, thereby enabling improvement in accuracy of calculating the estimated number of packets at various times for each flow.

Also, the management apparatus 50 combines the information of the sample packets acquired from a plurality of communication apparatuses when generating time series data, thereby enabling improvement in accuracy of calculating the estimated number of packets at various times for each flow.

By combining the information of the sample packets acquired from the communication apparatuses 20 of the external data center DCj, it is possible to improve the accuracy of calculating the estimated number of packets at various times for each flow.

Also, by eliminating in advance time series data in which there is a possibility that the communication pattern has changed as a result of the external data center DCj, the management apparatus 50 can improve the accuracy with which the effect certainty is estimated when a communication fault has occurred in the data center DCi.

Also, by the management apparatus 50 determining whether the external communication apparatus of the external data center DCi is running to detect faults in the network between data centers, it is possible to estimate the degree of certainty that a customer having a system across multiple data centers has been affected by a fault in the inter-data center network.

Also, by removing from the communication pattern communications generated regardless of whether or not they will be used by the customer (ARP transmissions, broadcast reception, etc., for example), the management apparatus 50 can improve the accuracy of estimating the degree of certainty that a customer has been affected by the communication fault.

Also, the management apparatus 50 can confirm the presence or absence of periodicity by combining a plurality of non-periodic flows according to set conditions (for example, a condition by which a plurality of flows with low traffic over a short period of time are generated, such as in web servers).

Also, as a result of the management apparatus 50 issuing a notification of the presence or absence of redundancy of the communication apparatus 20 when estimating the effect of a fault on a customer, it is possible to provide to the manager of the data center DCi information indicating whether the communications of the customer were only momentarily interrupted as a result of the communication path being switched to the redundant communication apparatus at the fault occurrence time, or whether communications of the customer continued to be affected until recovery from the fault due to the fact that the communication apparatus 20 had no redundancy.

Also, by the management apparatus 50 eliminating flows with no communication for a given period or longer as well as time series data included in communication pattern groups that have not been classified for a given period or longer, it is possible to reduce the amount of data as well as reduce the incidence of false estimation when estimating the effect certainty resulting from referring to old data.

Additionally, by processing the time series data under the assumption that communications with no periodicity have a set period (such as a period of one day) when analyzing a communication pattern, the management apparatus 50 can perform effect certainty estimation on communications with no periodicity in a similar to communications having periodicity.

Also, when there is a notification of fault information, the management apparatus 50 issues a notification of the fault effect certainty as well as the type of communication that was affected and the estimated number of packets, thereby allowing for the manager of the data center DCi to establish the degree of priority in handling faults with consideration for the type of flow and the estimated number of packets in addition to the degree of certainty that the customer was affected by the fault.

Also, by the management apparatus 50 storing the degree of importance for each customer and issuing a notification of the degree of certainty that the customer was affected by the fault as well as the degree of importance when a notification of fault information is being issued, it is possible for the manager of the data center DCi to establish the degree of priority in handling faults with consideration for the degree of importance of the customer in addition to the degree of certainty that the customer was affected by the fault.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

The invention claimed is:

1. A management apparatus connectable to a network that connects a group of computers, comprising:
   a processor configured to execute a program;
   a storage device configured to store the program; and
   an interface configured to connect to the network,
   wherein the storage device stores communication patterns indicating periodic change over time in traffic flows for customers that are series of data flowing between computers within the group of computers in the network, and identification information of communication apparatuses in the network through which the flows pass, and
   wherein the program causes the processor to execute:
      a reception process that receives, from a communication apparatus with respect to which a fault has occurred, fault information that includes the identification information of the communication apparatus and a fault occurrence date and time;
      a selection process of selecting a flow that passes through the communication apparatus from among a group of flows on the basis of the identification information of the communication apparatus included in the fault information received during the reception process;
      a comparative determination process of determining based on comparative traffic flow whether the communication pattern of the flow is similar with respect to estimated number of packets per a time interval to a stored communication pattern of time series data of traffic with respect to the communication apparatus within a period from a set period prior to the fault occurrence date and time to the fault occurrence date and time;
      a calculation process that calculates the certainty that the flow has been transmitted on the fault occurrence date and time on the basis of respective ratios of estimated number of packets per the time interval of the traffic of the compared communication patterns; and
      an output process of outputting calculation results obtained by the calculation process.

2. The management apparatus according to claim 1,
   wherein the program causes the processor to execute:
      an acquisition process of acquiring a time series data indicating the change over time in the traffic of the flow;

a determination process of determining whether time series data acquired in the acquisition process have periodicity;

a division process of dividing time series data into period units if time series data is determined to have periodicity according to the determination process; and a recording process of recording a group of time series data in period units divided in the division process as a communication pattern indicating periodic change over time in traffic of the flow for a period of time over which the group of time series data spans, wherein, in the comparative determination process, the processor determines whether the time series data of the comparative communication pattern is similar to the communication pattern of each flow among communication patterns of the group of flows indicating periodic change over time in the traffic of the flow recorded in the recording process.

3. The management apparatus according to claim 2,
wherein, in the acquisition process, the processor acquires time series data indicating a change over time in the traffic of a flow that does not conform to a prescribed elimination condition.

4. The management apparatus according to claim 2,
wherein, in the division process, the processor divides the group of time series data in period units into a plurality of groups having similar said time series data in period units, and
wherein, in the recording process, the processor records each of the plurality of groups as a communication pattern indicating a periodic change over time in the flow.

5. The management apparatus according to claim 2,
wherein, in the division process, the processor eliminates, from the group of time series data in period units, time series data in period units that belongs to a period from a fault occurrence time to a fault recovery time in an external data center differing from the data center including the group of computers and the network.

6. The management apparatus according to claim 1,
wherein the program causes the processor to acquire traffic of flows in a prescribed period from the communication apparatuses through which the flows pass, and on the basis of the traffic of flows during the prescribed period for the respective communication apparatuses through which the acquired flows pass, to execute an updating process of updating the traffic of the flows stored in the storage device.

7. The management apparatus according to claim 6,
wherein, in the updating process, the program causes the processor to update the traffic of the flows stored in the storage device, according to an average value of the traffic of the flows during the prescribed period for the respective communication apparatuses through which the flows pass.

8. The management apparatus according to claim 6,
wherein the communication apparatuses through which the flows pass include communication apparatuses in a network in an external data center differing from the data center including the group of computers and the network.

9. The management apparatus according to claim 1,
wherein the communication apparatuses are communication apparatuses where a fault has occurred in an external data center differing from the data center including the group of computers and the network, and wherein, in the reception process, the program causes the processor to receive fault information that includes the identification information of the communication apparatus and a fault occurrence date and time by monitoring whether the communication apparatus is running.

10. The management apparatus according to claim 1,
wherein the storage device stores information indicating a presence or absence of redundancy for each communication apparatus, and
wherein, in the output process, the program causes the processor to output information indicating the presence or absence of redundancy in the communication apparatus along with the calculation results.

11. The management apparatus according to claim 1,
wherein the program causes the processor to execute:
a detection process of detecting a flow that has not been received over a predetermined period; and
a deletion process of deleting traffic of the flow detected by the detection process.

12. A management method performed by a management apparatus connected to a network that connects a group of computers, in which the management apparatus includes: a processor that executes a program; a storage device that stores the program; and an interface that connects to the network, the method comprising:

storing in the storage device communication patterns indicating periodic change over time in traffic flows for customers that are series of data flowing between computers within the group of computers in the network, and identification information of communication apparatuses in the network through which the flows pass, and executing by the processor:
a reception process that receives, from a communication apparatus with respect to which a fault has occurred, fault information that includes the identification information of the communication apparatus and a fault occurrence date and time;

a selection process of selecting a flow that passes through the communication apparatus from among a group of flows on the basis of the identification information of the communication apparatus included in the fault information received during the reception process;

a determination process of determining based on comparative traffic flow whether the communication pattern of the flow is similar with respect to estimated number of packets per a time interval to a stored communication pattern of time series data of traffic with respect to the communication apparatus within a period from a set period prior to the fault occurrence date and time to the fault occurrence date and time;

a calculation process that calculates the certainty that the flow has been transmitted on the fault occurrence date and time on the basis of respective ratios of estimated number of packets per the time interval of the traffic of the compared communication patterns; and an output process of outputting calculation results obtained by the calculation process.

13. The method according to claim 12, wherein:
in the determination process, the processor determines whether the time series data of the comparative communication pattern is similar to the communication pattern of each flow among communication patterns of the group of flows.

14. A non-transitory recording medium readable by a processor having an accessible storage device, the non-transitory recording medium storing a management program that manages a network that connects a group of computers such that;

the storage device stores communication patterns indicating periodic change over time in traffic flows for customers that are series of data flowing between computers within the group of computers in the network, and identification information of communication apparatuses in the network through which the flows pass, and the management program causes the processor to execute:
a reception process that receives, from a communication apparatus with respect to which a fault has occurred, fault information that includes the identification information of the communication apparatus and a fault occurrence date and time;
a selection process of selecting a flow that passes through the communication apparatus from among a group of flows on the basis of the identification information of the communication apparatus included in the fault information received during the reception process;
a determination process of determining based on comparative traffic flow whether the communication pattern of the flow is similar with respect to estimated number of packets per a time interval to a stored communication pattern of time series data of traffic with respect to the communication apparatus within a period from a set period prior to the fault occurrence date and time to the fault occurrence date and time;
a calculation process that calculates the certainty that the flow has been transmitted on the fault occurrence date and time on the basis of respective ratios of estimated number of packets per the time interval of the traffic of the compared communication patterns; and
an output process of outputting calculation results obtained by the calculation process.

15. The non-transitory recording medium according to claim 14, wherein the management program causes the processor, in the determination process, to determine whether the time series data of the comparative communication pattern is similar to the communication pattern of each flow among communication patterns of the group of flows.

* * * * *